United States Patent [19]
Orbach et al.

[11] Patent Number: 5,549,166
[45] Date of Patent: Aug. 27, 1996

[54] HITCH ASSEMBLY CONTROL SYSTEM

[75] Inventors: Abraham Orbach, Naperville; Dale W. Panoushek, Lemont; William L. Schubert, Downers Grove, all of Ill.

[73] Assignee: Case Corporation, Racine, Wis.

[21] Appl. No.: 560,016

[22] Filed: Nov. 17, 1995

Related U.S. Application Data

[63] Continuation of Ser. No. 388,153, Feb. 13, 1995, Pat. No. 5,469,921, which is a continuation of Ser. No. 118,450, Sep. 8, 1993, Pat. No. 5,421,416.

[51] Int. Cl.⁶ .................................................. A01B 63/112
[52] U.S. Cl. .................. 172/4; 172/3; 364/424.07
[58] Field of Search ................................ 172/2, 3, 4, 4.5, 172/8, 7, 10, 11, 12; 364/148, 153, 180, 424.07; 56/10.2 D, 10.2 R

[56] References Cited

U.S. PATENT DOCUMENTS

| | | | |
|---|---|---|---|
| 4,503,916 | 3/1985 | Wiegandt | 172/3 |
| 4,518,044 | 5/1985 | Wiegardt et al. | 172/7 |
| 4,837,691 | 6/1989 | Boe et al. | 172/3 X |
| 4,846,283 | 7/1989 | Batchellen | 172/10 |
| 5,143,159 | 9/1992 | Young et al. | 172/8 |
| 5,190,111 | 3/1993 | Young et al. | 172/7 |
| 5,261,495 | 11/1993 | Szymczak | 172/2 |
| 5,291,407 | 3/1994 | Young et al. | 172/7 X |
| 5,320,186 | 6/1994 | Strosser et al. | 172/8 |

Primary Examiner—Terry Lee Melius
Assistant Examiner—Robert Pezzuto
Attorney, Agent, or Firm—Foley & Lardner

[57] ABSTRACT

A hitch assembly control system including an actuator which positions the hitch assembly in response to control signals provided to an electrically driven actuator. The control system further includes an electronic controller operated under the influence of a program for deriving the control signals for the actuator from a series of inputs which monitor and measure various performance criteria. The program functions to operate the hitch assembly in a plurality of different operating states. In a DRAFT state, the hitch assembly position is controlled under the influence of at least four independently set variables. The control system of the present invention is capable of calibrating the hitch assembly configuration as well, as the limits of hitch assembly operation. Moreover, the control system of the present invention is capable of detecting, categorizing and recording failures which occur in various states of hitch assembly operation. The control system of the present invention furthermore is capable of maintaining a substantially constant rate of elevational movement of the hitch assembly regardless of the weight of the ground engaging assembly attached to the hitch assembly.

20 Claims, 19 Drawing Sheets

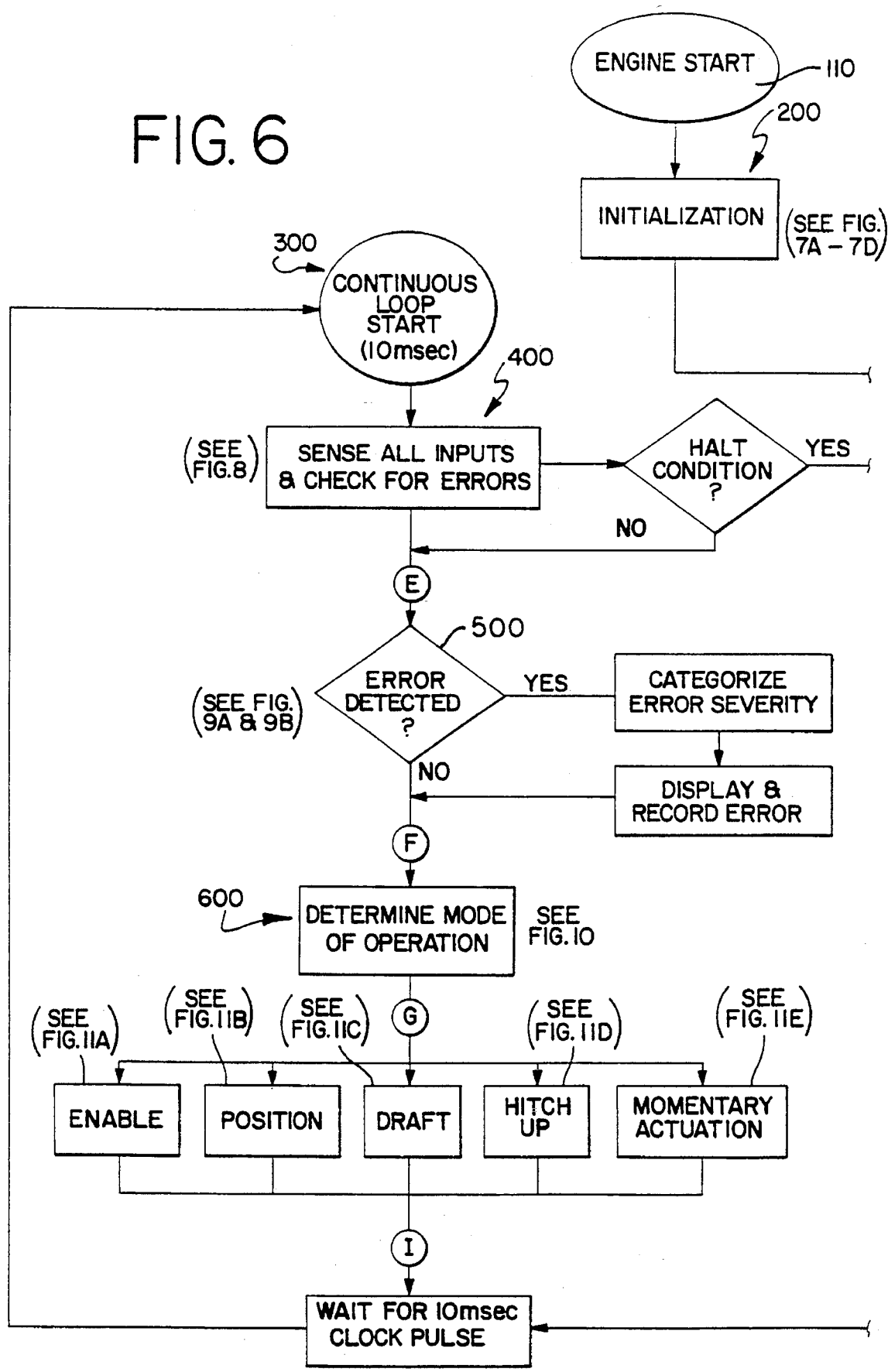

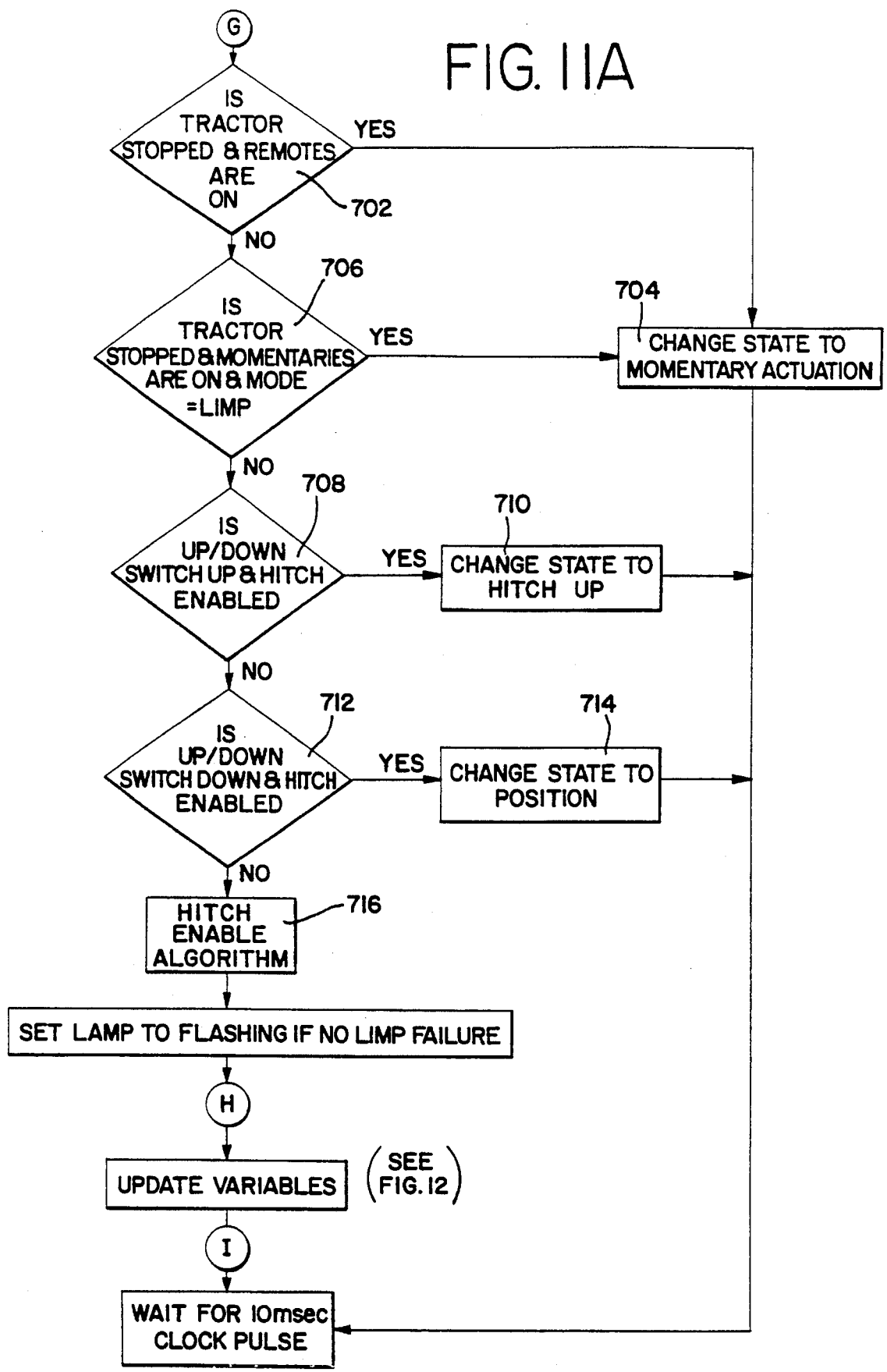

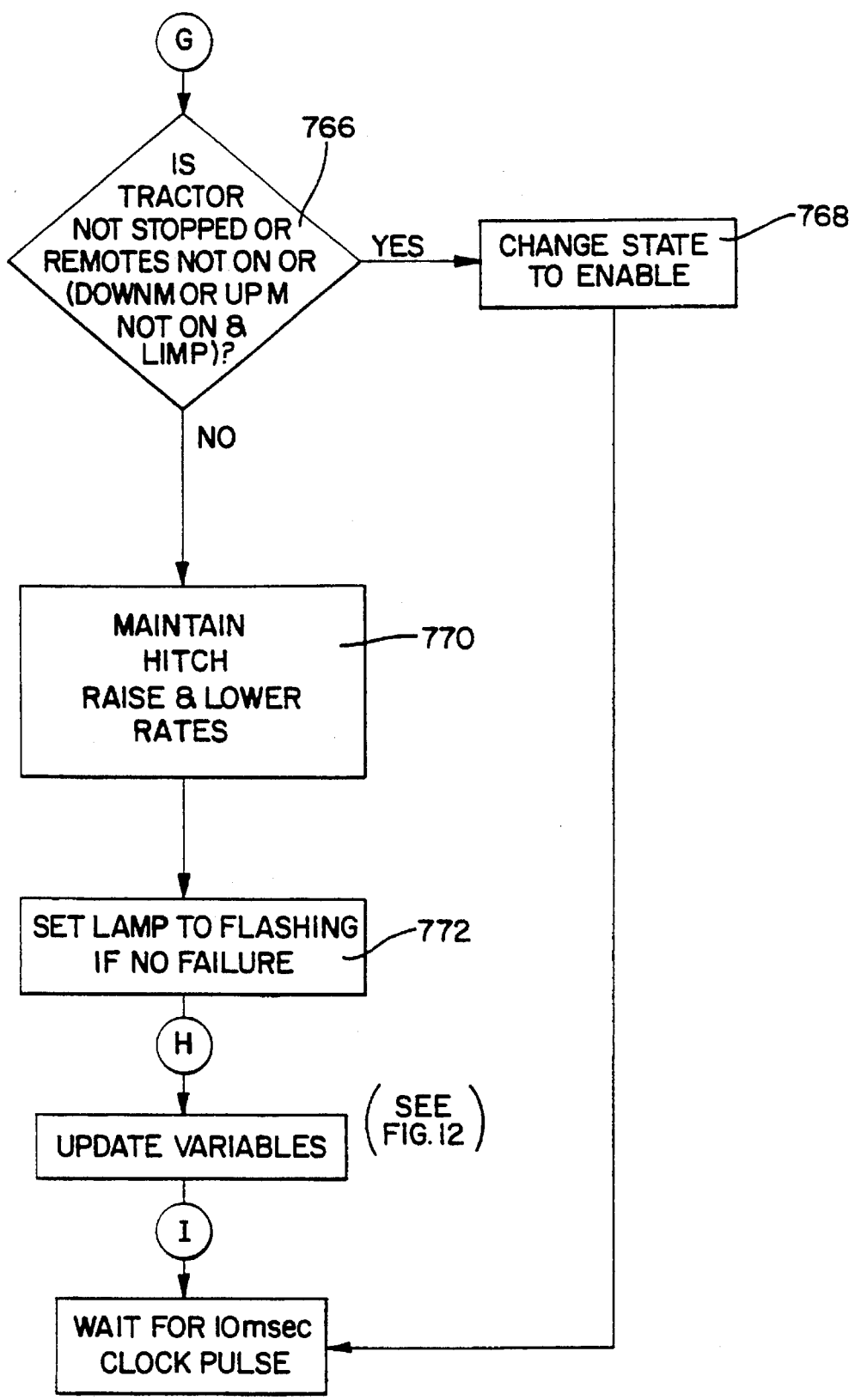

HITCH ASSEMBLY CONTROL SYSTEM

The present application is a continuation of patent application Ser. No. 08/388,153, filed on Feb. 13, 1995, now U.S. Pat. No. 5,469,921, which is a continuation of patent application Ser. No. 08/118,450, filed on Sep. 8, 1993, now U.S. Pat. No. 5,421,416.

RELATED DOCUMENTATION

This application includes a microfiche appendix including one microfiche and ten frames.

A portion of the disclosure of this patent document contains material which is subject to a claim of copyright protection. The copyright owner has no objection to the reproduction by anyone of the patent document or the patent disclosure as it appears in the Patent and Trademark Office patent file or records, but otherwise reserves all other rights whatsoever thereto.

FIELD OF THE INVENTION

The present invention generally relates to hitch assemblies connected to a frame of an off-highway implement and, more particularly, to an electronic control system for controlling operation of the hitch assembly.

BACKGROUND OF THE INVENTION

Various types of hitch control system have been heretofore designed, used and proposed. The purpose of each of these systems is to control the elevation of the hitch assembly thereby maintaining the ground penetration of the equipment or ground engaging assembly attached to the hitch assembly at a substantially constant depth during its operation.

Conventional hitch control systems include simple controls for setting the depth of ground penetration by the Found penetrating equipment adapted to be attached to the hitch assembly. Known systems include a hitch command lever which sets the preferred elevational position of the hitch assembly and thereby the depth of ground penetration equipment and a "mix" control which regulates the draft load sensed by the hitch assembly and resulting from the ground interaction with the assembly being positioned by the hitch assembly. Changing soil conditions in any particular field being worked or in different fields, however, make such heretofore known systems inadequate. As will be appreciated by those skilled in the art, the heretofore known systems offered Limited adjustability of the control systems to changing field conditions and, thus, complicate operations for the owner who may have thousands of acres of land with different soil characteristics throughout the various fields. Moreover, once the system is set, there is no opportunity for the operator to make on-going changes to the hitch assembly setting in response to changing conditions in the field being worked.

Hitch assemblies are designed to work with a myriad of different ground engaging and penetrating assemblies or equipment. The limited ability to adjust the heretofore known systems, limits the ability of the system to adjust to changes associated with the assemblies or equipment attached thereto. Thus, the versatility of the implement is substantially reduced thereby increasing the cost to the farmer.

The heretofore known hitch control systems tend to vigorously respond to changes in sensed draft loads being applied to the hitch assembly. While a vigorous response may be appropriate in some circumstances, the changes to the hitch loading can result in an inconsistent ride for the operator which quickly wears on the operator throughout a day of field operations. On the other hand, the inability of the hitch control assembly to respond to changing load conditions imparted to,the hitch assembly impacts on the engine performance and wear.

Most hitch control systems are capable of operating in more than one operating state. For example, if the off-highway implement is being driven across a field with the ground engaging equipment or assembly attached thereto being adapted to either engage or penetrate the ground, the control system preferably operates the hitch assembly in a DRAFT state. On the other hand, some hitch assemblies operate satisfactorily in a POSITION state during which the hitch assembly moves between two positions. When the ground penetrating equipment is being initially connected to the hitch assembly, most hitch assemblies include remote switches to facilitate raising or lowering the hitch assembly from, an area remote from the operator station of the implement. To allow for operation of the remote switches, the control system is operable in a MOMENTARY state. Alternatively, if the assembly is being transported from one location to another as by driving the implement with the assembly attached thereto, the hitch assembly operated in a HITCH LIP state.

While improvements have been made to such control systems, no known control system provides a lower limit to movement of the hitch assembly when it operates in DRAFT state. With known control systems, the hitch assembly and the equipment or assembly carried thereby are substantially free to descend to the mechanical limits of the hitch assembly. The inability to set a lower limit complicates ground penetration in that the equipment can go below the setting selected by the operator thus causing related operational problems for the off-highway implement during the DRAFT state.

Most heretofore known control systems control their descent rate of the hitch assembly to lower the equipment toward the ground from a raised position. Such systems, however, do not consider the weight of the equipment that is attached to the hitch assembly when designing the control systems. Thus, hitch assemblies having relatively large pieces of equipment connected thereto will naturally descend at a faster rate than the hitch assembly will when a smaller piece of equipment attached thereto. During operation of the remote switches, heretofore known control systems failed to regulate the descent rate of the hitch assembly based on the weight of the equipment connected thereto. The inability to know how fast the such equipment may move toward the ground from a raised or elevated position, can cause serious and costly damage to such equipment as through operator neglect. A damaged piece of equipment can cause further downtime resulting from the repairs or replacement of parts required for the equipment.

Thus there is a need and a desire for a hitch assembly control system which addresses these significant drawbacks associated with the heretofore known control systems and provides the operator with flexibility and assurance of operation which was heretofore unknown.

SUMMARY OF THE INVENTION

In view of the above and in accordance with the present invention there is provided a control system for a hitch assembly which provides position control of the hitch assembly relative to the frame of the off-highway implement to which it is adapted to be attached. The hitch assembly of the present invention has the added ability to regulate the position of the hitch, assembly through independent and heretofore unknown adjustments. The hitch assembly is adapted to be positioned as through an actuator for controlling the elevation of a ground penetrating assembly connected to the hitch assembly and adapted to be pulled behind the off-highway equipment.

The hitch assembly can be provided with different "configurations". As used herein, the term "configuration" is meant to denote different options that are provided in combination with the hitch assembly. In one "configuration", the hitch assembly is provided with various mechanisms which allows the control system to operate the hitch assembly in a DRAFT state. The control system of the present invention is preferably configured to operate the hitch assembly in a plurality of different states of operation.

In a preferred embodiment, the control system includes a first sensor assembly for sensing a draft force produced by the interaction of the ground penetrating assembly and the field through which it is drawn and an operator controlled reference draft force. The preferred form of control system further includes a second sensor assembly for sensing the actual position of the hitch assembly and an operator controlled reference hitch position. A central processing unit is connected to the first and second sensor assemblies for computing a first error value representative of the difference between the draft force produced by the ground interaction and the reference draft force and for computing a second error value representative of the difference between the actual position of the hitch assembly and the desired or reference position of the hitch, with the central processing unit deriving the control signals for the actuator from the computed first and second error values.

A salient feature of the present invention relates the provision of first and second operator settable devices for independently adjusting the control signals that are applied to the actuator. The first operator settable device adjusts the computed results of the first and second error values calculated and allows a range of movement of the hitch assembly relative to the reference hitch position to maintain a substantially constant load on the hitch assembly during steady state conditions. The range of movement of the hitch assembly having a linear function relation to the setting of the first settable device. The second settable device controls as a function of an independent and predetermined operator setting the time over which the actuator is operated to move the hitch assembly between positions so as to bring the hitch assembly within predetermined limits of those settings selected by the operator.

Another aspect of the present invention relates to the program used by the control unit to control elevation of the hitch assembly. The program of the control unit responds to a series of sensor inputs which monitor the various operating conditions of the hitch assembly and tractor. The program includes an initialization stage during which the various operating components of the hitch assembly are set to predetermined values. Thereafter, the program of the control unit enters into a timed closed loop cycle during which the various sensor inputs to the control unit are analyzed to detect and categorize errors inherent with the hitch assembly components. During the initialization stage and every timed cyclic loop thereafter, the various operating components are analyzed and the errors detected and categorized before any of the various states of hitch assembly operation are automatically determined.

In the illustrated embodiment, the errors are categorized into varying stages of seventy. The severest of the error categorizations disabling operation of the hitch assembly until the specific errors are corrected.

A preferred form of hitch assembly includes an operator controlled hitch command mechanism which comprises an apparatus which is selectively movable between positions and to which the elevation of the hitch assembly responds. The control system of the present invention is responsive to the movement of the operator command apparatus. In addition to the operator command mechanism, a preferred form of the hitch assembly includes an operator adjustable mechanism for setting the upper limit of movement of the hitch assembly. Having once set the upper limit, the control system inhibits the hitch assembly from moving above the upper limit thereby protecting the tractor from inadvertent damage by the hitch assembly. The upper limit of hitch assembly vertical movement is applicable in all states of hitch assembly operation while a lower limit of hitch assembly movement is applicable in two states of hitch assembly operation and a mechanical stop acts as a limit stop when a remote switch assembly is used to elevationally position the hitch assembly.

The hitch assembly of the present invention further includes an operator adjusted mechanism for controlling the descent rate of the hitch assembly. The control system of the present invention is responsive to the descent rate mechanism and operates the actuator such that the descent rate of the hitch assembly is maintained substantially constant independent of the weight of any implement connected to the hitch assembly. The substantially constant rate of descent of the hitch assembly is likewise maintained when the hitch assembly is incrementally moved under the influence of the remote switch assembly. In a most preferred form of the invention, the agent rate of the hitch assembly is controlled at a substantially constant rate when the remote switch assembly is being used for vertically positioning of the hitch assembly.

In addition to operating the hitch assembly in any of several different states of operation, the control system of the present invention furthermore is capable of calibrating the hitch assembly. That is, in a preferred form of the invention, the control unit is operated under the influence of a program which includes a calibration mode of operation during which the configuration of the hitch assembly (whether it be suited for DRAFT or POSITION states) as well as various operating parameters are calibrated to set predetermined limits of operation for the hitch assembly.

The objects, aims and advantages of the present invention will become more readily apparent from the following detailed description of the invention, the appended claims, and the following description of the drawings.

BRIEF DESCRIPTION OF THE DRAWINGS

FIG. 6 through 12 are flow charts which schematically illustrate various operational steps inherent with the control system of the present invention.

DETAILED DESCRIPTION OF THE PRESENT INVENTION

Figure 1:
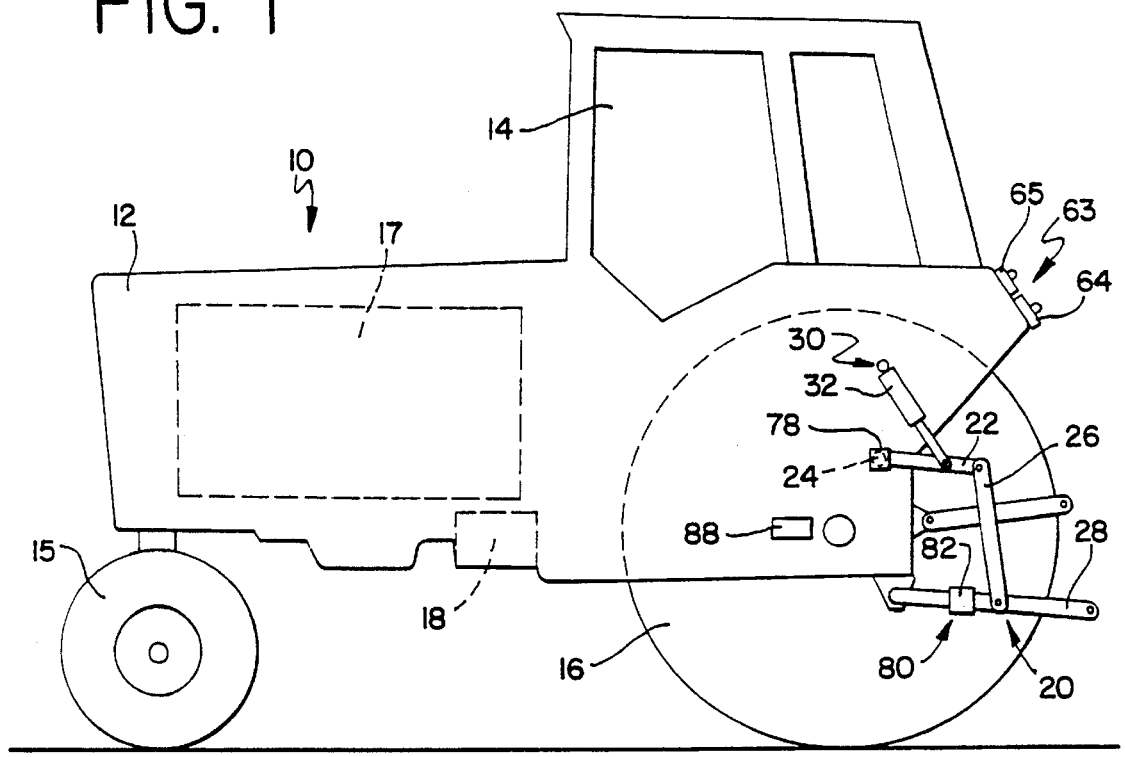
FIG. 1 is a simplified schematic illustration of an off-highway implement such as an agricultural tractor which is equipped with a hitch assembly according to the present invention.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

In FIG. 1, there is schematically represented an off-highway implement such as a tractor 10. Tractor 10 includes an operator station 12 arranged on a frame 14 which is supported for movement across a field by a front pair of steerable wheels 15 and a rear pair of wheels 16. In the illustrated embodiment, wheels 16 are driven through a drive train including an engine 17 mounted on frame 12. The tractor 10 further includes an electrical system having a conventional battery 18. It should be appreciated, however, that the present invention is equally applicable to other forms of off-highway implements suited to have hitch assemblies connected thereto, i.e., bulldozers; articulated four-wheel drive tractors, front-wheel drive tractors, or other forms of implements which are supported by tracks rather than wheels. For purposes of this description and without detracting from its spirit or scope, the present invention will be described as being associated with an agricultural tractor.

Tractor 10 is further provided with a hitch assembly 20 which connects a ground penetrating assembly or other form of relatively large equipment to a rear end of the tractor. The ground penetrating assembly may be in the form of a conventional moldboard plow or chisel plow. Alternative forms of ground penetrating assemblies which are adapted to be towed behind the tractor may be likewise connected to the hitch assembly 20 of the tractor without departing from the spirit and scope of the present invention.

Hitch assembly 20 is preferably designed as a three-point hitch and includes a pair of lift arms 22 which are each connected to and extend from a rock shaft 24. As is conventional, a pair of lift links 26 connect the lift arms 22 to a pair of draft links 28. The position of the draft links 28 and, thus, the elevation and working depth of the implement is controlled by a hitch actuator apparatus 30. In the illustrated embodiment, the hitch actuator apparatus 30 preferably includes at least one hydraulic motor or cylinder 32 connected to the hitch assembly 20 and responsive to input signals thereto for controlling the elevation of the draft links 28 of the hitch assembly 20. The above-described hitch assembly is but one example of a hitch mechanism to which the present invention applies and it will be appreciated by those skilled in the art that the present invention is equally applicable to other types of hitch mechanisms.

Figure 2:
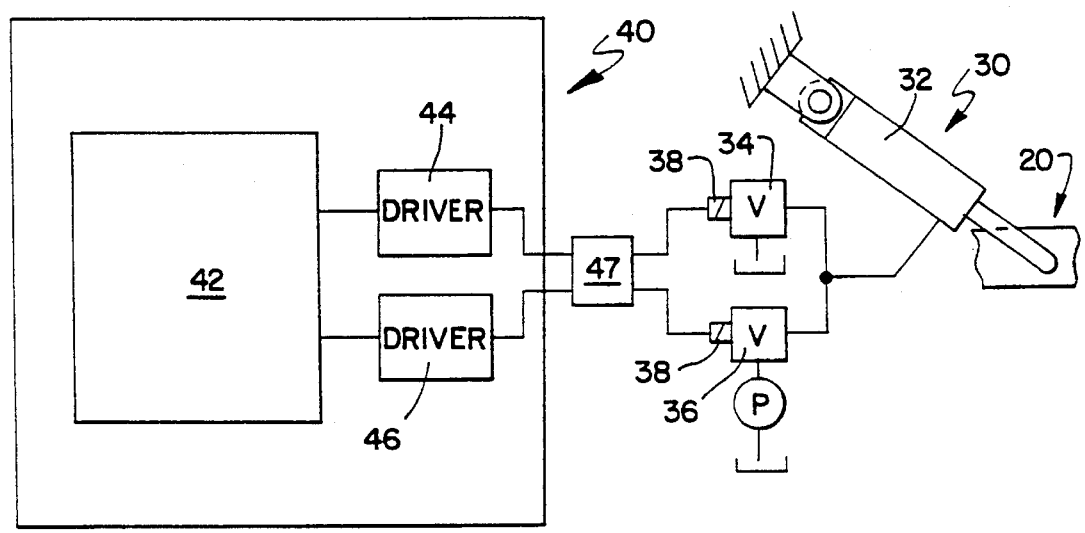
FIG. 2 is a simplified electrical and hydraulic schematic diagram of the control system of the present invention.

As shown in FIG. 2, the hydraulic motor or cylinder 32 is operated in response to the operation of hydraulic valves 34 and 36 which control the flow to and from cylinder 32. As will be appreciated, the function of valves 34 and 36 can be embodied into a single valve without departing from the spirit and scope of the present invention. In the illustrated embodiment, valves 34 and 36 are preferably designed as solenoid operated valves and each includes an electrical coil 38 which operates the respective valve in response to electrical control signals generated by a control system 40. It should be appreciated, however, that other forms of electrically driven mechanisms can be used to position the rock shaft 24 without departing from the spirit and scope of the present invention.

The control system 40 includes a control unit 42 which receives a series of inputs representing different operating characteristics and a pair of valve drivers 44 and 46. The valve drivers are connected to and control operation of the valves 34 and 36 through a conventional relay 47. Preferably, each valve driver 44, 46 is a conventional pulse-width modulated valve current driver but other forms of drivers are known and can likewise be used to successfully operate the valves in the intended manner.

Figure 3:
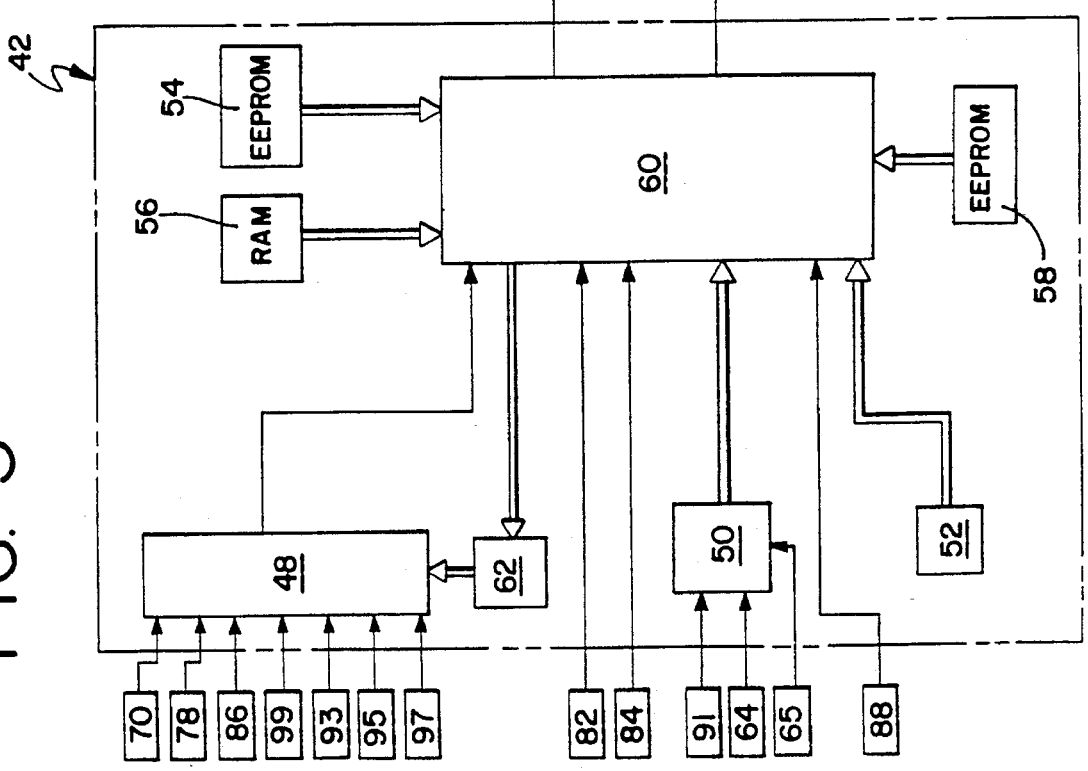
FIG. 3 is an electrical diagram of a portion of the control system of the present invention.

As shown in FIG. 3, the control unit 42 preferably includes an analog switch 48, a first input latch 50, a second input latch 52, an electronically programmable read-only memory (EPROM) 54, a random access memory (RAM) 56, an electrically erasable. programmable read-only memory (EEPROM)58, and a suitable microprocessor 60 such as an INTEL 80196KB microprocessor. As will be appreciated, data received from various inputs can be either directly received via an internal analog-to-digital converter in the microprocessor or via the analog switch 48, input latch 50, or input latch 52. In the illustrated embodiment, a chip selector 62, controlled by the microprocessor 60, selects the channel or input to be sampled during operation of the hitch assembly 20.

As mentioned above, the hitch assembly 20 can be provided with several different "configurations". The provision of various options arranged in combination with the hitch assembly 20 allows the control system of the present invention to operate the hitch assembly 20 in various states of operation. For example, to enable the hitch assembly to operate in a DRAFT state requires the control system 40 to receive and respond to various inputs from several selectively settable mechanisms. Alternatively, the hitch assembly 20 can be configured with less options and yet be operational.

Figure 4:
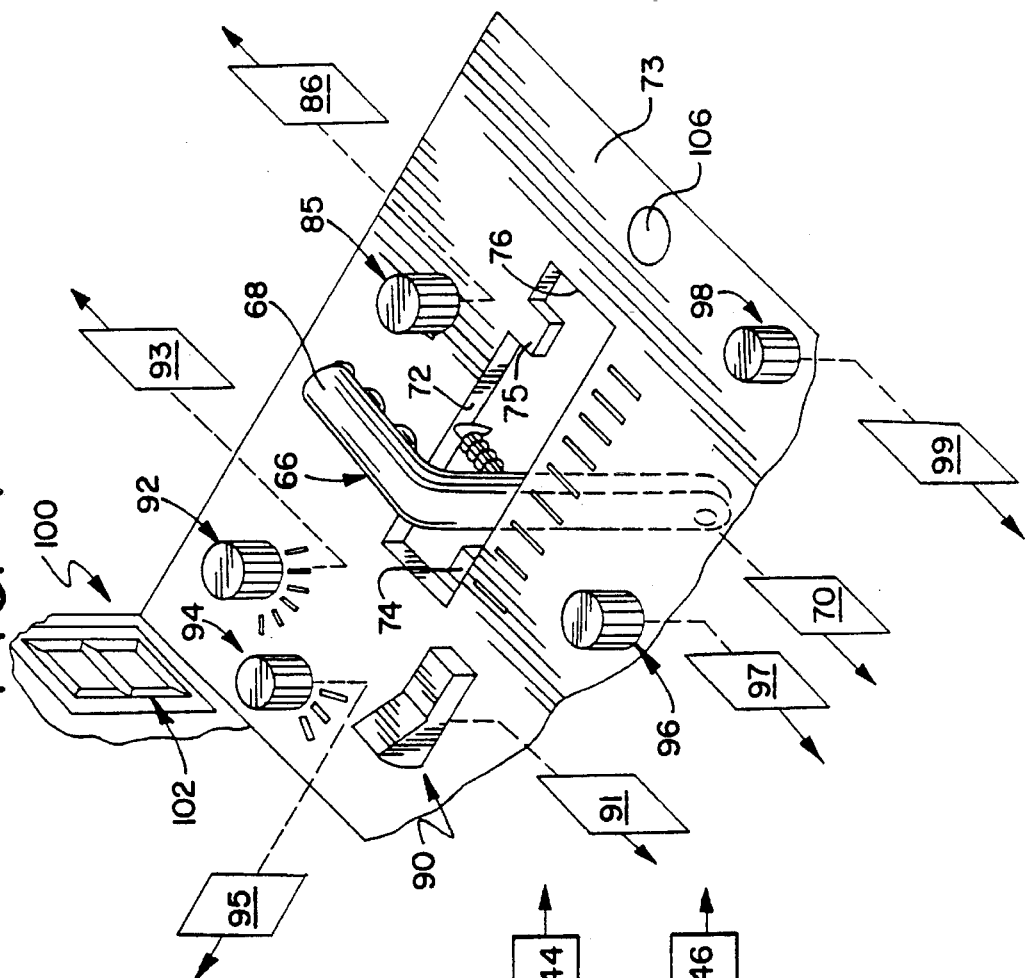
FIG. 4 schematically illustrates a control console arranged in a cab region of the tractor.

Turning to FIG. 4, an operator control command mechanism 66 is arranged in the operator station 14 of the tractor. The command mechanism 66 is satiable in different positions under the influence of the operator for elevationally moving the hitch assembly 20 between an upper position and a lower position and for establishing a desired working depth of the implement connected to the hitch assembly 20.

In the illustrated embodiment, the command mechanism 66 includes an adjustable mechanism 68 i.e., a movable lever which is coupled to a signal device such as a transducer or potentiometer 70. The command lever 68 is movable within an elongated slot 72 of a command console 73 preferably arranged in the cab region 14 of the tractor. An adjustable limit stop 74 connected to and carried by the console 73 acts as a mechanical stop for the adjustable mechanism 68 and sets a lower limit stop for the hitch assembly 20. The opposite end 76 of slot 72 likewise acts as a mechanical stop for the mechanism 68 and serves as an extreme upper limit stop for the hitch assembly 20. Protrusion 75 is provided in slot 72 and cooperates with mechanism 68 to maintain mechanism 68 adjacent to end 76, and hence to maintain hitch assembly 20 in its extreme raised position, such as for transport. Depending upon the position of the adjustable mechanism 68, the senor or potentiometer 70 generates a signal which is delivered to the microprocessor through the analog switch 48; which signal is representative of desired position of the hitch assembly 20.

Returning to FIG. 1, a preferred embodiment of the hitch assembly 20 includes a remote switch assembly 63 for elevationally moving the hitch assembly 20. As shown, the remote switch assembly 63 preferably includes a pair of remote momentary switches 64 and 65 mounted away from the operator station 12 of the tractor 10 and near the rear end thereof. In the illustrated embodiment, remote switch 64 constitutes a momentary UP switch while remote switch 65 constitutes a momentary DOWN switch. Alternatively, a two position switch assembly could be used rather than separate switches 64, 65.

Informational data concerning the actual position of the hitch assembly 20 is likewise provided to the control unit 42. In the illustrated embodiment, a sensor 78 such as a conventional rotary potentiometer is used to monitor the angular disposition of rock shaft 24 (FIG. 1) forming pan of the hitch assembly. The output signal generated by sensor 78 represents the actual or sensed position of the hitch assembly 20 and, thereby, the position of the implement with respect to tractor 10. The signal from the sensor or potentiometer 78 acts as an input to the analog switch 48. It should be appreciated that sensing the angular disposition of rock shaft 24 is merely exemplary of one method of monitoring or detecting the actual position of the hitch assembly 20 and that alternative methods are well within the spirit and scope of the present invention.

After the implement has penetrated the ground, a draft force will be established from the implement/ground interaction. As shown in FIG. 1, the hitch assembly 20 is provided with a draft sensor assembly 80 for sensing the drift force applied to the hitch assembly 20 through implement/ground interaction. In the illustrated embodiment, the draft sensor assembly 80 includes a pair of sensors 82 arranged in the left and right draft links 28 of the hitch assembly 20 to monitor or measure the draft force. As shown in FIG. 3, the draft force sensors 82 are connected to and provide inputs to the microprocessor 60. As will be appreciated, other sensor arrangements could be used for measuring the draft force applied to the hitch assembly without detracting from the spirit and scope of the present invention.

As shown in FIG. 4, the control console 73 further includes a draft force command mechanism 85. The draft force command mechanism 85 is settable in different positions under the influence of the operator for setting a desired level of draft force or draft load to be applied to the hitch assembly 20 during a plowing operation. The different settings or positions of mechanism 85 are measured by a potentiometer 86 or other suitable signalling device. Depending upon the adjusted position of the command mechanism 85, the potentiometer 86 provides a signal to the microprocessor 60 which represents an operator controlled reference draft force. As will be appreciated, the reference draft force setting regulated by mechanism 85 is directly related to the desired depth of the implement during a plowing operation.

A tractor axle speed input signal, which represents the ground speed of the tractor, is also provided to the control system 413. As shown, a ground speed sensor 88 is arranged on the tractor 10 for measuring the ground speed thereof. Sensor 88 may be of any suitable type which is capable of providing an input signal to the microprocessor 60 which is representative of the ground speed of the tractor.

The control console 73 of the tractor may further include an up/down switch assembly 90 for independently controlling the elevation of the hitch assembly 20 between a lower limit position and an upper limit position independently of the hitch command device 66. Switch assembly 90 is preferably configured as a rocker switch which is selectively movable between an UP position and a DOWN position. In a preferred form of the invention, switch assembly 90 can also be moved to a DOWN M position. The DOWN M position of switch assembly 90 is accessible from the DOWN position and is a momentary position which is maintained as long as the operator holds the switch assembly 90 in this position. A suitable sensor 91 or the like monitors the three possible positions of the switch assembly 90 and provides any of three output signals indicative of the position of the switch assembly 90. The signals from the sensor 91 are inputted to the microprocessor 60 through input latch 50.

The control console 73 further includes an operator controlled descent mechanism 92. The purpose of the descent mechanism 92 is to enable the operator to control the rate at which the hitch assembly 20 moves from a higher position to a lower position. The descent mechanism 92 is selectively adjustable by the operator and includes a conventional potentiometer 93 or other suitable device for providing a signal representative of the operator selected drop rate for the hitch assembly 20 to the microprocessor 60 through the analog switch 48. In the illustrated embodiment, the drop rate selected by the operator controls the descent rate of the hitch assembly independent of the weight of an implement attached to the hitch assembly 20.

In a preferred form of the invention, an upper limit knob assembly 94 is provided to allow the operator to set or limit the maximum vertical movement of the hitch assembly 20 independently of the hitch command device 66 thereby avoiding inadvertent errors which could be incurred with movement of the control lever 68 between positions. The upper limit knob assembly 94 is satiable in different positions under the influence of the operator thereby allowing for adjustment of the upper limit of the hitch assembly 20. In the illustrated embodiment, a conventional potentiometer 95 or other suitable device provides an input signal indicative of the setting of the upper limit knob assembly 94 and, thus, the upper limit of the hitch assembly 20, to the microprocessor 60 preferably through the analog switch 48.

For accommodating changes in field and/or soil conditions and a myriad of other considerations, the control system 40 of the present invention further receives input signals from a travel knob or apparatus 96 preferably arranged in the area of console 73. As will be described in detail below, the travel apparatus 96 is an operator adjustable knob-like mechanism which, during operation of the implement attached to the hitch assembly, allows the hitch assembly 20 to move within a predetermined vertical range independently of the desired settings selected by the hitch command mechanism 66 and draft force command mechanism. The travel apparatus 96 is movable through a range of settings; with each setting on the travel assembly 96 allowing for a predetermined range of vertical travel of the hitch assembly 20. A conventional potentiometer 97 or other suitable device provides an input to the microprocessor 60 indicative of the setting of the travel apparatus 96. Notably, the range of travel allowed by the travel apparatus 96 has a linear function relation to elevational movements of the hitch assembly 20 in DRAFT state.

Moreover, the control system 40 receives input signals from a response assembly 98 likewise arranged on or in the area of the console 73. The purpose of the response assembly 98 is to control the response rate or response time period over which the hitch assembly 20 vertically moves to maintain a substantially constant predetermined force on the hitch assembly during operation of the implement attached to the hitch assembly in DRAFT state. The response assembly 98 is an operator adjustable device which is satiable through a range of positions; with each position setting being determinative of a different response time for the hitch assembly 20. A conventional potentiometer 99 or other suitable device provides an input signal representative of the operator selected response rate set by the response assembly 98. The signal from the potentiometer 99 is preferably received by the microprocessor 60 through the analog switch 48.

In those tractors so equipped, the remote switch assembly 63 (FIG. 1) likewise provides input signals to the microprocessor 60. In the illustrated embodiment, the remote UP switch 64 and the remote DOWN switch 65 each provide a signal indicative of the operative state thereof to the microprocessor 60 preferably through the input latch 50.

A series of other analog inputs indicative of various operating components on the tractor 10 may likewise be provided to the microprocessor 60 of the control unit 42. Examples of such inputs include: voltage of the battery 18; operativeness of the coils 38 used to operate the valves 34, 36; a regulator voltage; and etc. These inputs are preferably provided to the microprocessor 60 of the control unit 42 through the analog switch 48, the input latch 50, the input latch 52 or any suitable combination thereof.

Figure 5:
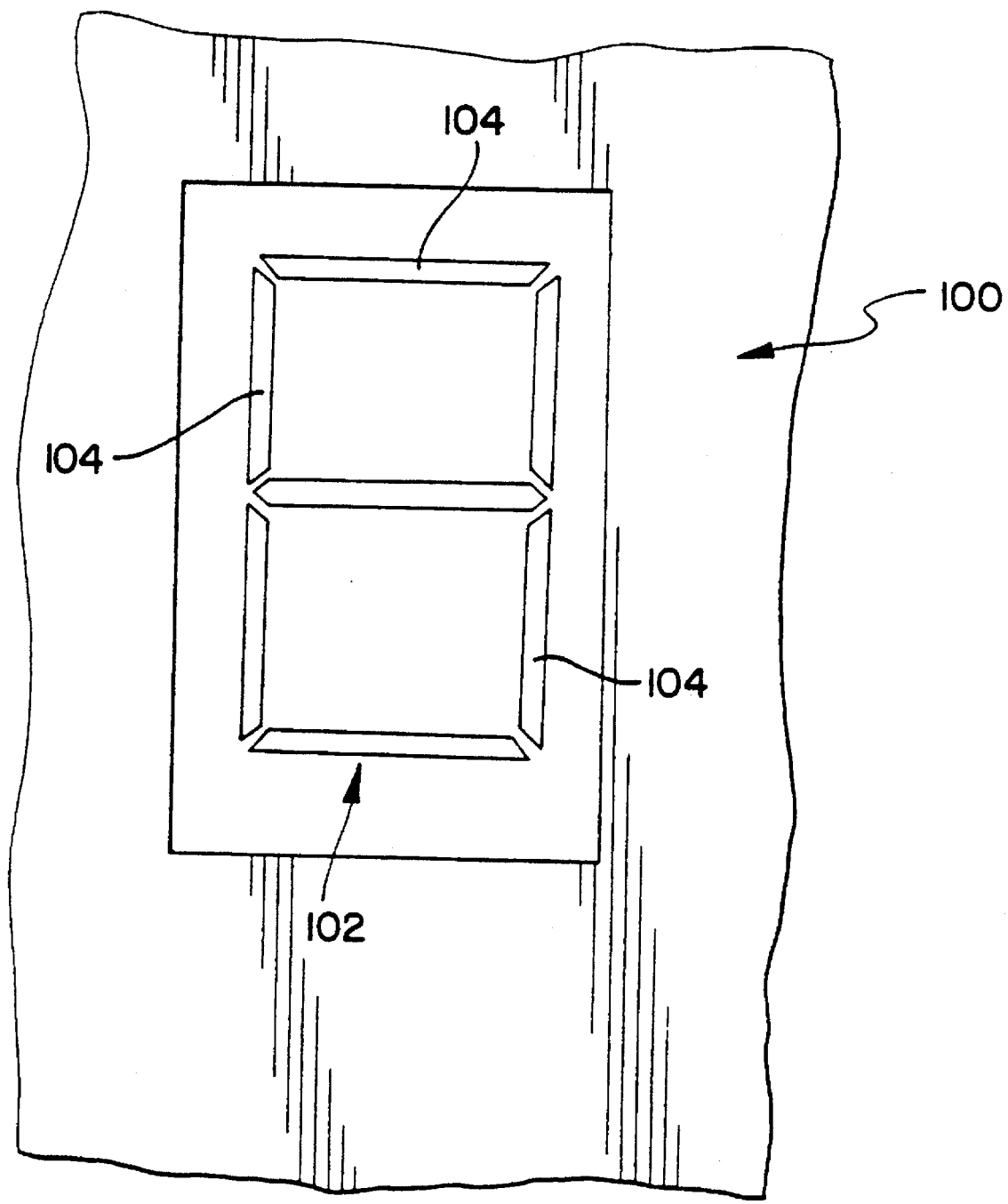
FIG. 5 is an elevational view of an indicator assembly forming part of the present invention.

In accordance with another feature of this invention, and as shown in FIG. 4 an indicator assembly 100 is arranged preferably in the area of the control console 73. As shown in FIG. 5, the indicator assembly 100 preferably includes an alphanumeric display 102 for illustrating various diagnostic information related to the operation of the hitch assembly 20. The alphanumeric display 102 is preferably comprised of a series of illuminable elements 104 arranged in a predetermined pattern relative to each other. As will be described in detail hereinafter, the control unit 42 includes suitable driver circuitry for operating the alphanumeric display 102 in a manner yielding an informational message to the operator, for example, regarding a short in the electrical coils 38 of the valves 34, 36. Other instructional messages are also provided, directed to the correction or repair of various errors detected in the hitch assembly 20.

Returning to FIG. 4, the control console 73 further includes an indicator light 106. As will be described in detail hereinafter, suitable electrical circuitry within the control unit 42 operates the light 106 in any of three different modes or conditions: (1) OFF; or (2) FLASHING: or (3) ON. The particular operating condition of the fight 106 reflects the operational state or condition of the hitch assembly 20.

The control system operates under the influence of a control algorithm executed by the microprocessor 60. Operation of the control system under the influence of the algorithm is schematically represented in the flow chart shown in FIG. 6.

As shown in FIG. 6, the control system 40 is preferably enabled concurrently with starting of the engine 17 on the tractor at step 110. At step 200, various variables and hardware are initialized. As will be discussed in detail hereinafter, steps 300 through 600 represent a continuous timed cycle or loop during which various operating conditions and various parameters for several different states of hitch operation are analyzed.

The subroutines involved with the initialization step 200 are schematically illustrated in FIGS. 7A through 7D. The program begins with initialization of the microprocessor 60 at step 202. At step 204, the indicator assembly 100 (FIG. 4) is shut OFF such that no visual indication will be provided on the display 102. In step 206, electrical current, if it exists, to the coils 38 for the valves 34 and 36 is interrupted thus disabling the hitch assembly 20 and thereby preventing inadvertent hitch assembly movement. At step 208, variables associated with various hitch assembly components, i.e., the pulse width modulated drivers 44, 46, are set to predetermined values. At step 210, various memories (EPROM 54 and RAM 56) of the microprocessor 60 are checked.

If the memories of the microprocessor 60 are acceptable, step 212 of the program directs the program to step 214 whereat a conventional software watchdog timer associated with the microprocessor 60 is checked for operativeness. In the illustrated embodiment, the watchdog timer of the microprocessor is reset about every 10 milliseconds by the software at each cycle or loop. If the watchdog timer times out, the system shall be reset and electrical currents to the coils 38 will be set to zero. If the memories associated with the microprocessor 60 are not acceptable, step 212 shifts the control system 40 into a HALT mode or condition represented by step 213 and from whence to step 214. When the control system is shifted into a HALT condition, the hitch assembly is incapable of being driven electronically and the alphanumeric display 102 of indicator assembly 100 provides a suitable informational message to the operator directing attention to the particular problem with the memories and the error is set to be written into the EEPROM 58.

At step 216 operation of the watchdog timer is analyzed. If operation of the watchdog timer is acceptable, analog inputs from the multitude of sensors associated with the hitch assembly are inputted to the microprocessor 60 at step 218. If operation of the watchdog timer is unacceptable, the control system 40 is shifted into a LIMP mode or condition represented by step 217 and from whence the program shifts to step 218. A LIMP condition is less severe than the HALT condition and allows the hitch assembly 20 to be operated within limited parameters.

Figure 7A:
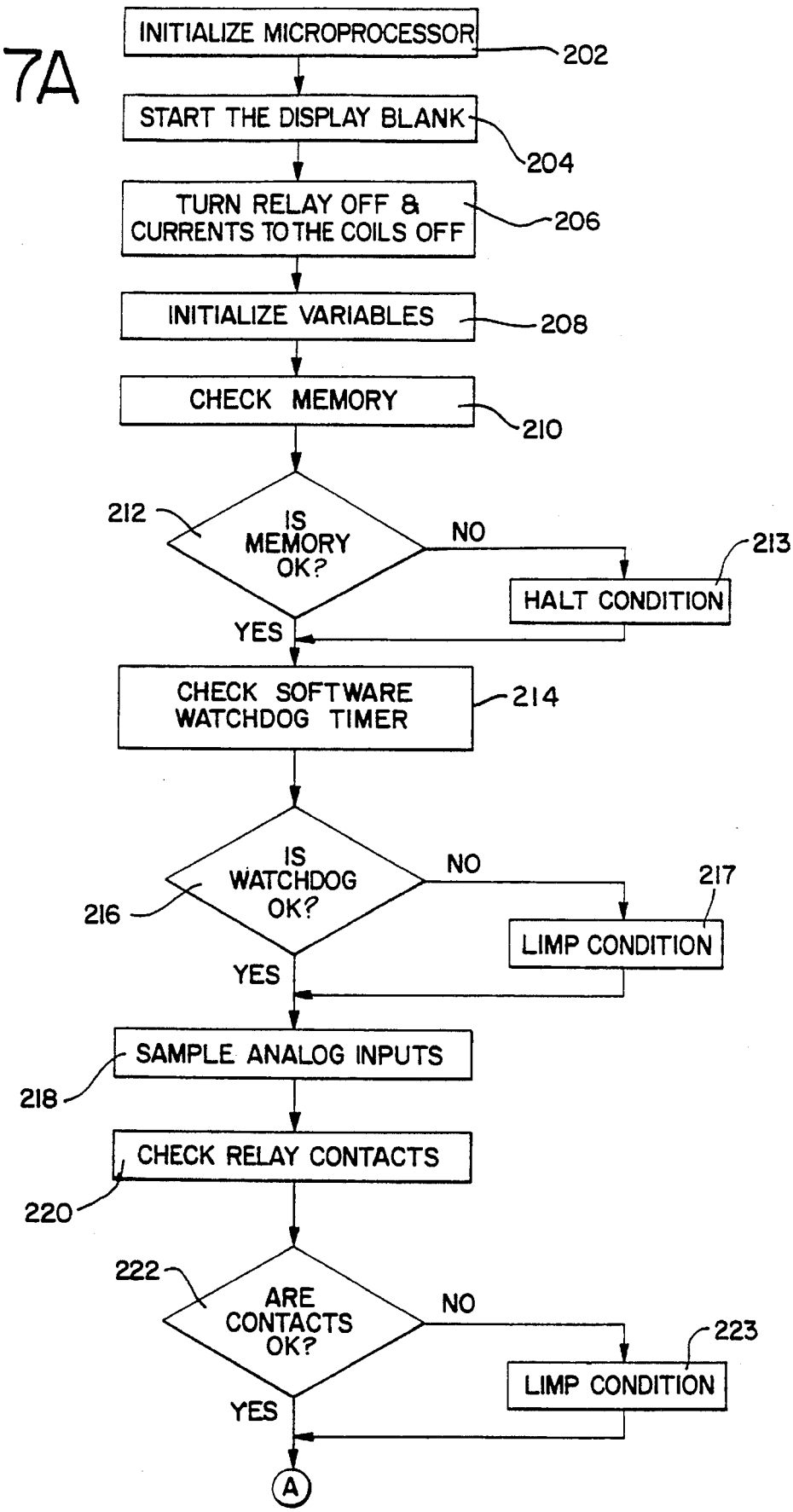
Figure 7B:
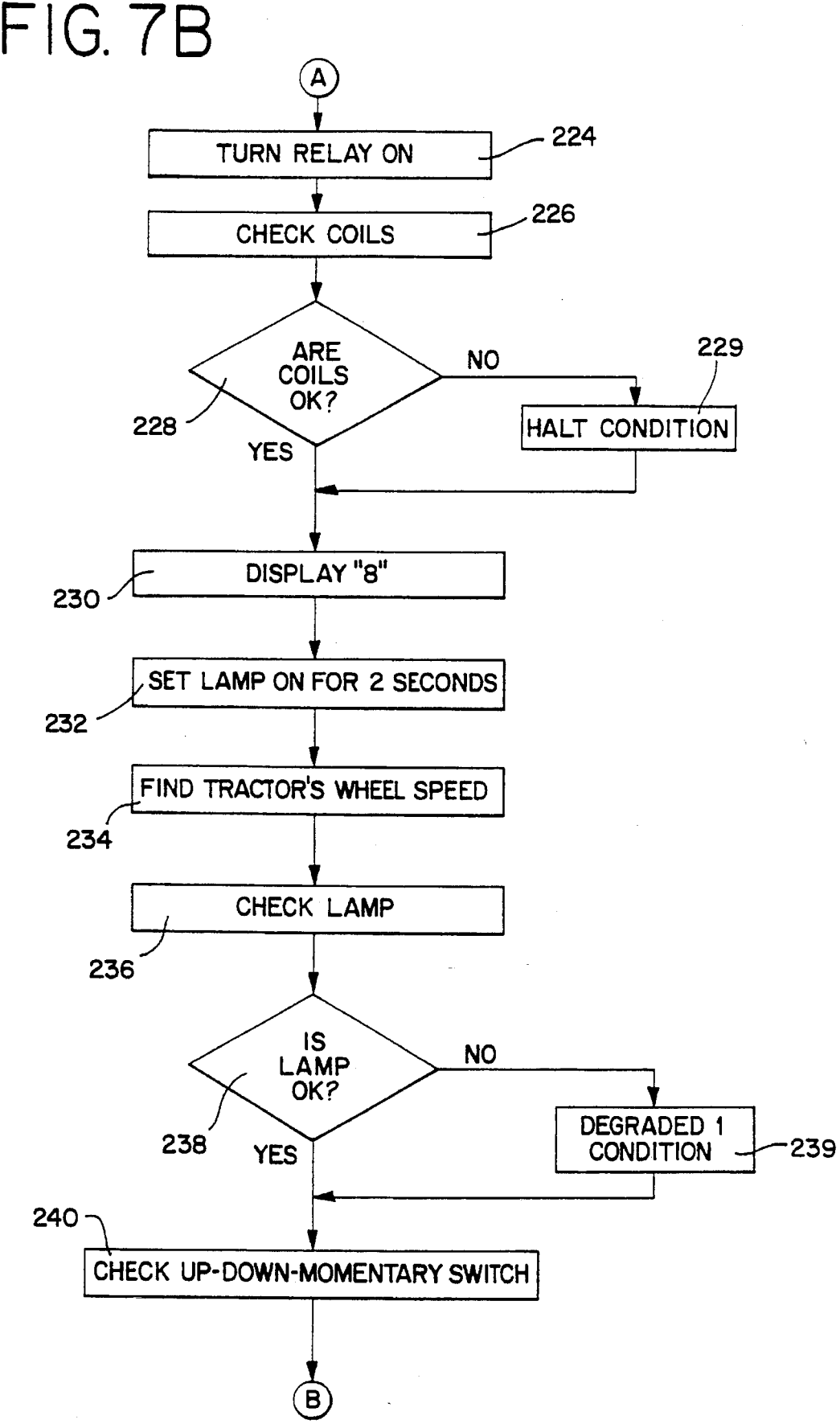

At step 220, the contacts on the relay 47 which energize the coils 38 of valves 44 and 46 are analyzed to see if such contacts are in working condition. If the relay contacts are working in an acceptable condition, step 222 directs the program to step 224 (FIG. 7B). At step 224, the relay coil 47 (FIG. 2) is energized to detect failure thereof. If the relay contacts are non-operational, step 222 shifts the control system 40 into a LIMP condition represented by step 223 and from whence the program shifts to step 224. As mentioned above, during a LIMP condition the hitch assembly is limited in its operation.

At step 226 in the program, the coils 38 for the valves 44 and 46 are checked to analyze their operation. If the coils 38 operate in an approved manner, step 228 directs the program to step 230. If the coils 38 for the valves 44 and 46 should be determined to be inoperative or faulty, step 228 shifts the control system into a HALT condition represented by step 229 and from whence the program shifts to step 230. During this initialization phase, one count of failure for the coils 38 is sufficient to shift the control system into a HALT condition. Normally, in a timed cycle, more than one detection of a faulty coil 38 is required to shift the control system into a HALT condition.

At step 230 of the program, all the illuminable elements 104 of the alphanumeric display 102 are powered for a predetermined period of time. Providing power to all the illuminable elements 104 of the display 102 provides a visual indication whether the circuitry for the indicator assembly 100 is operative.

At step 232 in the program, the indicator fight or lamp 106 is turned ON for a predetermined time period preferably approximating two (2) seconds for a future check. As mentioned above, the indicator light 106 operates in three (3) different modes or conditions: (1) OFF; or (2) FLASHING: or (3) ON. A FLASHING indicator fight indicates that the program for operating the hitch assembly 20 is in an ENABLE state. When the indicator light 106 is OFF the operator is provided with a visual indication that the control system has been analyzed and the hitch assembly is working properly. When the indicator light 106 is ON or illuminated, it provides a visual indication of a failure condition and alerts the operator to look to the indicator display assembly 1(30 for an informational message concerning the status of the hitch assembly.

At step 234 the computer program analyzes the ground speed of the tractor 10. That is, at step 234, the computer determines whether the tractor is moving or is stopped. If the tractor is moving certain futures of the program can be accessed. That is, if the tractor is moving, the program can be shifted into a DRAFT state of operation (described in detail below). If the tractor is moving, however, the system cannot calibrate various parameters of the hitch assembly and the remote switches 64, 65 of the remote switch assembly 63 are disabled. If the program detects at step 234 that the tractor is not moving, calibration of the hitch assembly can be achieved and the remote switches 64, 65 for controlling operation of the hitch assembly are enabled. If the tractor 10 is stopped, however, the program cannot be shifted into a DRAFT state of operation.

At step 236, the indicator light 106 is checked for operation. If the indicator light 106 is operational, step 238 allows the program to proceed to step 240. If the indicator light 106 is inoperative, the program for the control system is shifted into a DEGRADED 1 mode or condition, at step 239 and then the program proceeds to step 240.

At step 240, the program determines the operativeness of the up/down switch assembly 90 on the control console 73. That is, at step 240, a determination is made whether the switch assembly 90 is operating properly and to evaluate whether the switch assembly is positioned UP, or DOWN, or DOWN M.

After determining the operativeness of the switch assembly 90 at step 240, the program moves to step 242 (FIG. 7C) whereat a determination of whether the tractor is stopped is made. If the tractor 10 is not stopped, step 242 directs the program for the control system 42 to step 244 and no calibration of the system is effected notwithstanding the condition of the up/down switch assembly 90. On the other hand, if the tractor 10 is stopped, step 242 directs the program for the control system to step 246.

At step 246, an evaluation of the condition of the up/down switch assembly 90 is analyzed. Step 246 enables the program to evaluate whether calibration of the system is being requested. That is, if the up/down switch assembly 90 is in either an UP or DOWN condition, step 246 directs the program to step 244. If, on the other hand, the switch assembly 90 is positioned in a DOWN M condition, step 246 directs the program into a calibration mode at step 248. As will be appreciated, for calibration of the hitch assembly to be successful, no load shall be attached to the hitch assembly 20 during the calibration mode.

Calibration for the hitch assembly 20 begins at step 248. At step 250, the program waits for the expiration of a predetermined period of time which, in the preferred embodiment. generally equals about two (2) seconds. After the expiration of about two (2) seconds, the program shifts to step 252 whereat the condition of the up/down switch assembly 90 is again evaluated.

Step 254 of the program determines whether the control unit 242 is shifted into a calibration mode. If the switch assembly 90 is detected to no longer be in a DOWN M position at step 254, the program of the control system begins a calibration mode of operation. On the other hand, if, at step 254, the switch assembly 90 is detected to remain in a DOWN M position, the program shifts to step 256.

At step 256, the program conditions the alphanumeric display 102 of the indicator assembly 100 (FIG. 4) to provide a visual indication of the operativeness of the switch assembly 90. Step 256 further directs the program of the control system to step 244 from which the control system advances to step 245 where the operativeness of the EEPROM 58 is checked.

Step 260 directs the program of the control unit after checking the EEPROM 58. If the EEPROM 58 found to be operative, the program shifts to step 262 to determine whether calibration of the variables associated with the hitch assembly 20 have ever been accomplished. If the EEPROM 58 is faulty, step 260 directs the program into a HALT condition represented by step 263 and from whence the program shifts to wait expiration of the watchdog timer.

Step 262 directs the program of the control system as a function of whether calibration of the variables has ever been accomplished. If calibration of the hitch assembly 20 has never been accomplished, the program of the control system is shifted into a HALT condition represented by step 263 and, thus, the hitch assembly will not be permitted to operate. If calibration of the hitch assembly has been previously accomplished, the state of the hitch assembly 20 is known and the program is thereafter directed to step 264 which shifts the state of the hitch assembly 20 into an ENABLE state. After setting the program to the ENABLE state at step 264, the program shifts to step 266 whereat a software flag or the like is set to indicate that the hitch assembly is not enabled. As will be discussed in detail hereinafter, the software flag set at step 266 could be set to enable as a result of acts of the operator (see FIG. 11A, step 716).

At step 268 a determination is made whether an upper limit assembly or control similar to the upper limit assembly 94 is provided in combination with the hitch assembly. If there is an upper limit assembly, the system shifts from step 268 and enters into the timed closed loop program. If no upper limit assembly 94 is detected at step 268, the upper limit for the hitch assembly 20 is equated at step 270 with the maximum range of hitch movement for the hitch assembly and the system thereafter enters into the timed closed loop cycle.

Figure 7C:
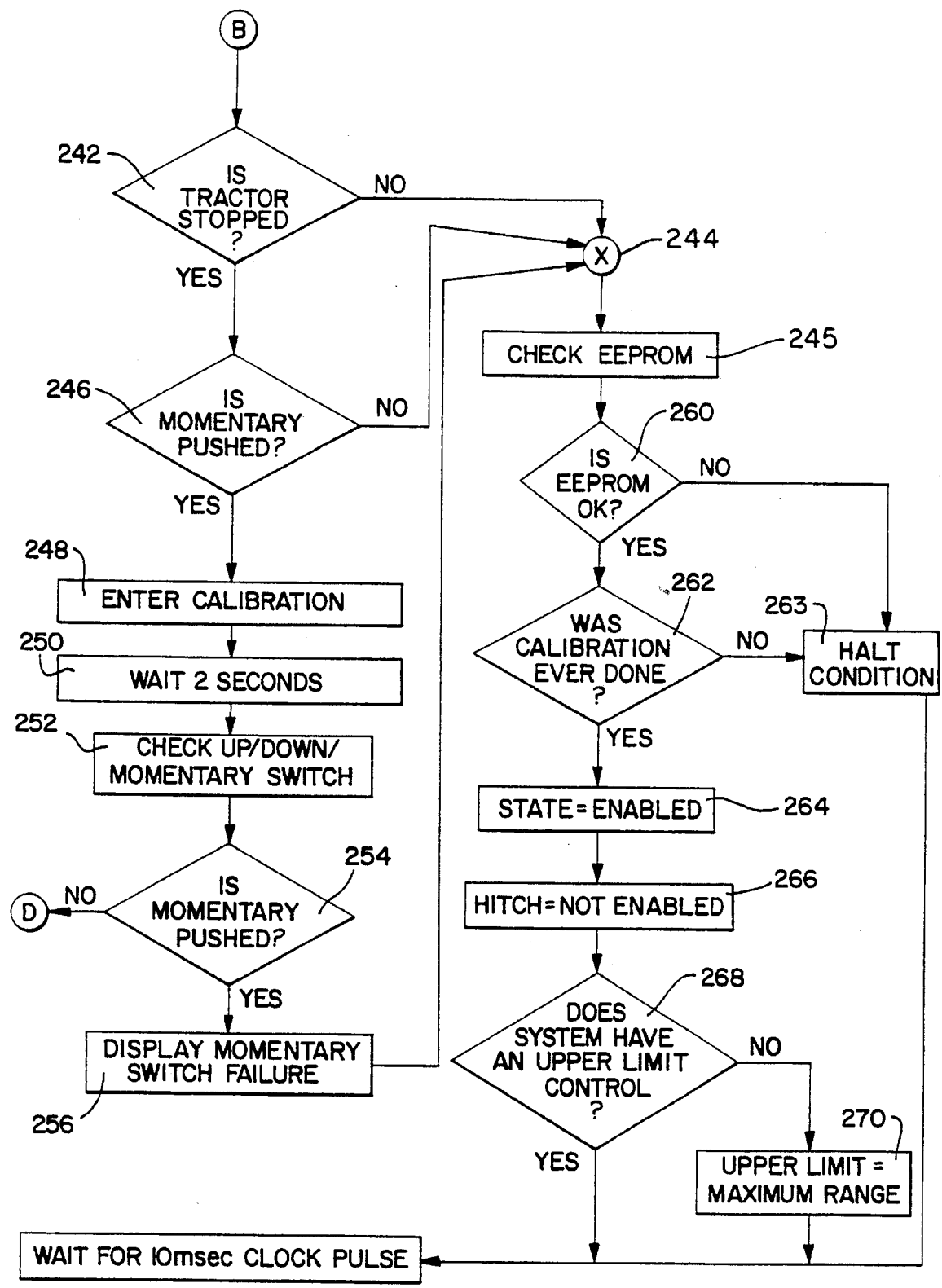

Returning to step 254 of FIG. 7C, if the program detects that the-up/down switch assembly 90 is not pushed into a DOWN M position, the program shifts into a calibration mode of operation. During the calibration mode, toggling of the switch assembly 90 between UP and DOWN positions is interpreted by the program to indicate NO whereas moving the switch assembly into a DOWN M position indicates YES. With the present invention, and during the calibration mode of operation, the switch assembly 90 becomes an interface between the operator and the hitch assembly 20 and the alphanumeric display 102 acts as a screen for the operator's viewing.

Figure 7D:
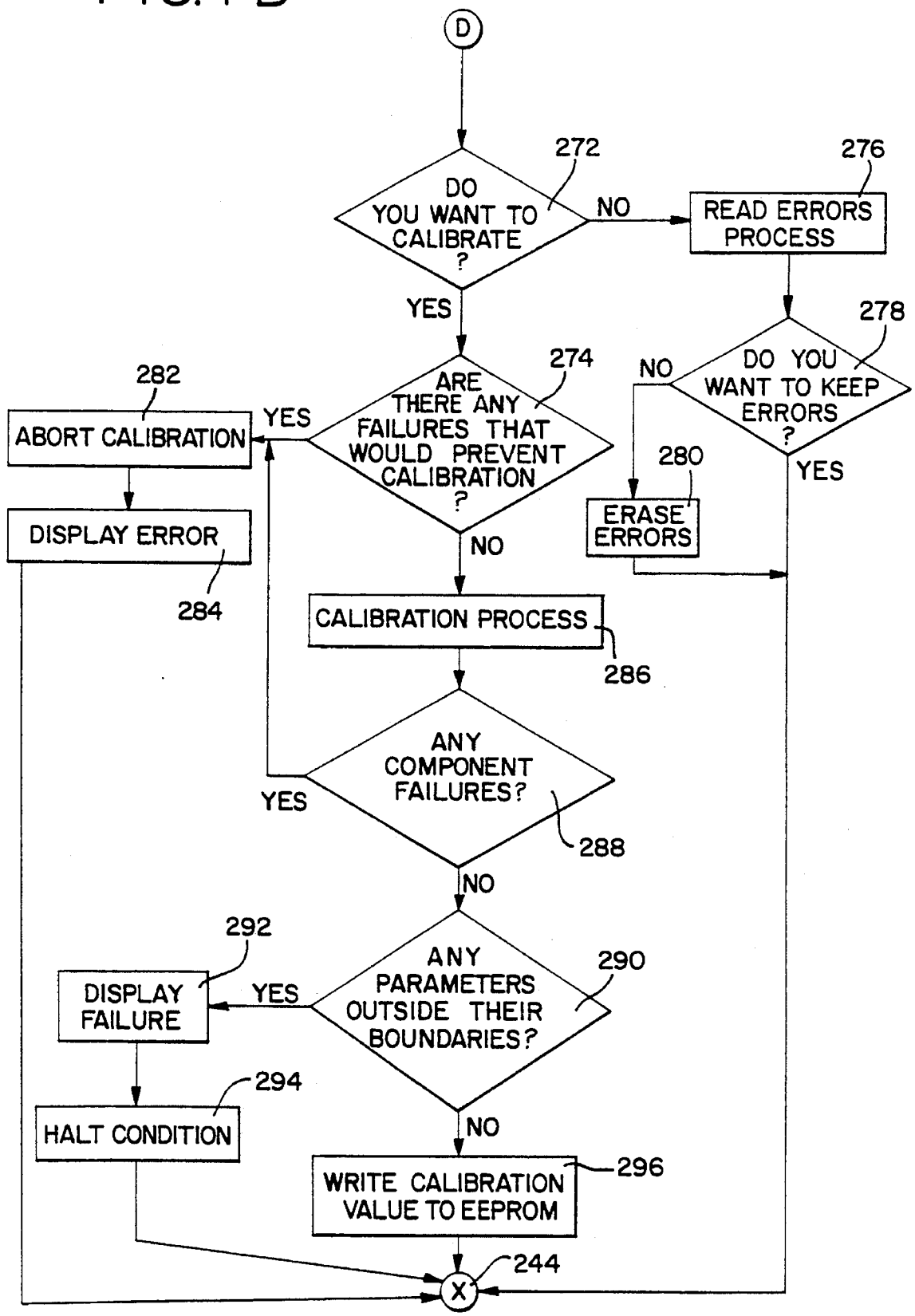

FIG. 7D schematically represents the steps involved in the program to effect calibration of the hitch assembly parameters. During a calibration mode, a series of questions are posed to the operator by displaying different letters on the indicator assembly 100 and the operator answers the questions by positioning and toggling the switch assembly 90. Calibration for the hitch assembly parameters begins at step 272 whereat an alphanumeric letter representative of the question—Do you want to calibrate?—is displayed on the indicator assembly 100. As mentioned above, with the present invention, YES and NO answers during calibration mode are determined by the position of the up/down switch assembly 90. With preferred embodiment, if calibration is requested, the operator selects the DOWN M position for the switch assembly 90. In response to a YES answer at step 272, the program shifts to step 274.

Alternatively, the operator may toggle the switch assembly 90 between UP and DOWN positions to indicate that calibration is not requested and to enable the operator to read errors. If the operator provides a NO answer at step 272, as by toggling the switch assembly 90, the program shifts to step 276. At step 276, errors previously recorded to the EEPROM 58 are displayed on the alphanumeric display 102 of indicator assembly 100 (FIG. 4) to enable the operator to read the errors. Toggling of the switch assembly 90 between DOWN and DOWN M changes the error indication on the indicator assembly 100 so that the operator can evaluate the different errors that were previously detected. The operator may continue to read the errors until a predetermined alphanumeric configuration is provided on the indicator assembly 100 which indicates that there are no further errors.

After reading the errors at step 276, the program shifts to step 278. At step 278 an alphanumeric re[presentation of the question—Do you want to keep errors?—is displayed on the indicator assembly 100. At this point, if the operator desires to record the errors, the switch assembly 90 is appropriately toggled to effect such ends. On the other hand, if the operator desires to erase the errors, the switch assembly 90 is positioned to shift the program to step 280 wherein the errors are erased from EEPROM 58 memory. From steps 278 and 280, the program is directed to step 244 (FIG. 7C).

If calibration is requested at step 272, the system will transition to step 274. In the preferred embodiment, calibration is divisible into: calibration of the hitch assembly configuration; and calibration of the hitch assembly parameters. At step 274, a determination is made whether certain failures detected of the hitch assembly during initialization step 200 prevent calibration of the system. If certain failures were detected during the initialization step 200, step 274 directs the program to step 282 whereat calibration of the system is aborted. In step 284, the alphanumeric display 102 of indicator assembly 100 is illuminated with an informational message indicative of the reason for the abortion at step 282. From step 284, the program proceeds to return to step 244.

If calibration of the hitch assembly is not aborted, step 274 directs the program to step 286. During the calibration process, various parameters for the hitch assembly are set to predetermined levels. An example of the calibration process might involve a determination of the threshold current levels required for raising and lowering the hitch, battery voltage, coil resistance and any of the series of other parameters involved with the hitch assembly at the time of calibration.

At step 288, the program is evaluated to determine if there are failures with the various components associated with the hitch assembly 20 while the system is in calibration and further looks to determine whether the failures relate to the operator's request to abort or to component failure. If there are failures, step 288 shifts the program to abort calibration at step 282. Otherwise, the system is shifted to step 290 whereat the values sensed during the calibration step at 286 are compared to predetermined values to determine the relation therebetween. If the calibrated values are not within a predetermined acceptable range, step 290 shifts the system to step 292. At step 292, the failure is displayed or the display assembly to indicate that which was encountered during calibration and to provide a visual indication that such failure was exclusive to the calibration mode. From step 292, the program shifts to step 294 which transitions the system to a HALT condition and from thence to step 244. If the parameters sensed during the calibration mode are within a predetermined range, the calibration values are provided to the EEPROM memory 58 at step 296. From step 296, the program is directed to step 244 as shown in FIG. 7C.

After the initialization step 200 for the hitch assembly 20 has been completed, the program is passed into a continuous timed closed loop or cycle. As schematically illustrated in FIG. 6, the timed loop begins at step 300 and proceeds to step 400.

Figure 8:
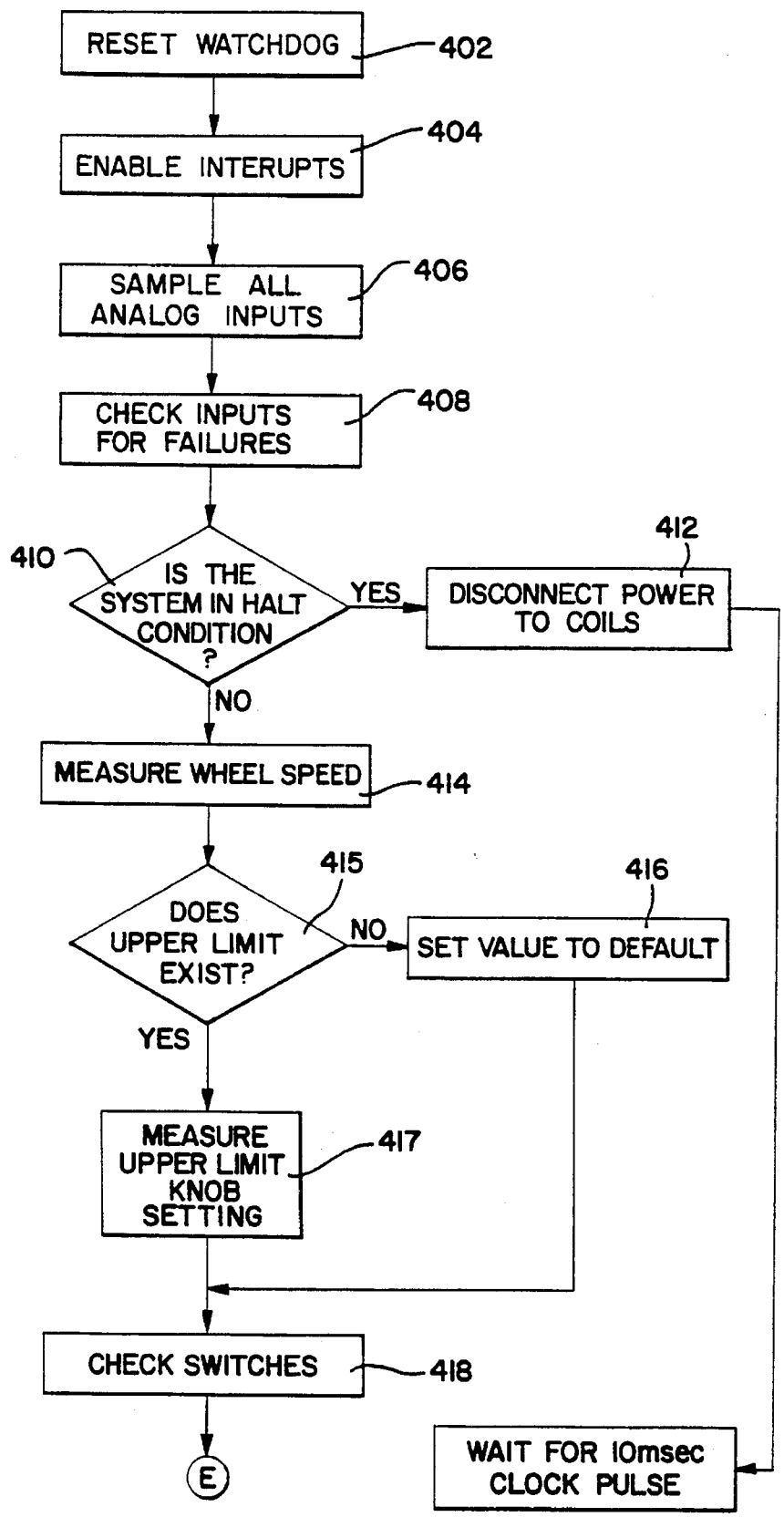

During step 400 all the inputs to the microprocessor 60 are sensed and checked for errors to determine the operability of the hitch assembly 20. The steps involved with step 400 are schematically illustrated in FIG. 8. At step 402, the watchdog software timer which was checked at step 214 and which is involved with the closed loop is reset. At step 404, the interrupts to the microprocessor 60 are enabled.

At step 406, all the analog inputs to the microprocessor 60 from the various sensors on the hitch assembly are sampled. After sampling the analog inputs at step 406, the program is directed to step 408 whereat the inputs are checked for failures. An example of the reviews accomplished at step 408 is comparing the output of the hitch position sensor 78 against its minimum and maximum possible readings. After Checking various analog inputs for failures, the program is directed to step 410 which determines if the control unit is in a HALT condition. If the control unit is in a HALT condition, the program is shifted to step 412 which disconnects power to the relay coils 47 thereby disabling vertical movements of the hitch assembly under the influence of the valves 34 and 36 (FIG. 2).

On the other hand, if the control unit is not in a HALT condition, the program is shifted to step 414 whereat the ground speed of the tractor is evaluated. Analysis of the ground speed of the tractor at step 414 allows certain hitch assembly operations to be inhibited i.e., calibration or remote actuation of the hitch assembly if the tractor is moving.

The program then shifts to step 415 whereat a determination is made on whether an upper limit exists for the hitch assembly 20. If there is no upper limit knob assembly such as 94 for variably setting the upper limit for the hitch assembly, the program shifts to step 416 whereat the maximum possible range of vertical upward movement for the hitch assembly 20 is set. After the maximum possible range of vertical upward movement for the hitch assembly is set at step 416, the program shifts to step 418. On the other hand, if the tractor 10 is equipped with an upper limit knob assembly such as 94, the program shifts to step 417 whereat the upper limit of movement of the hitch assembly is being measured. From step 417, the program shifts to step 418. At step 418, the program evaluates the operativeness of all the switches associated with the hitch assembly 20.

Returning to FIG. 6, after sensing the analog inputs and checking for errors at step 400, the program of the control unit 42 is thereafter shifted to step 500. At step 500, errors are detected and their severity is categorized. The severity of the errors can be categorized as DEGRADED 1 or DEGRADED 2 or LIMP.

Figure 9A:
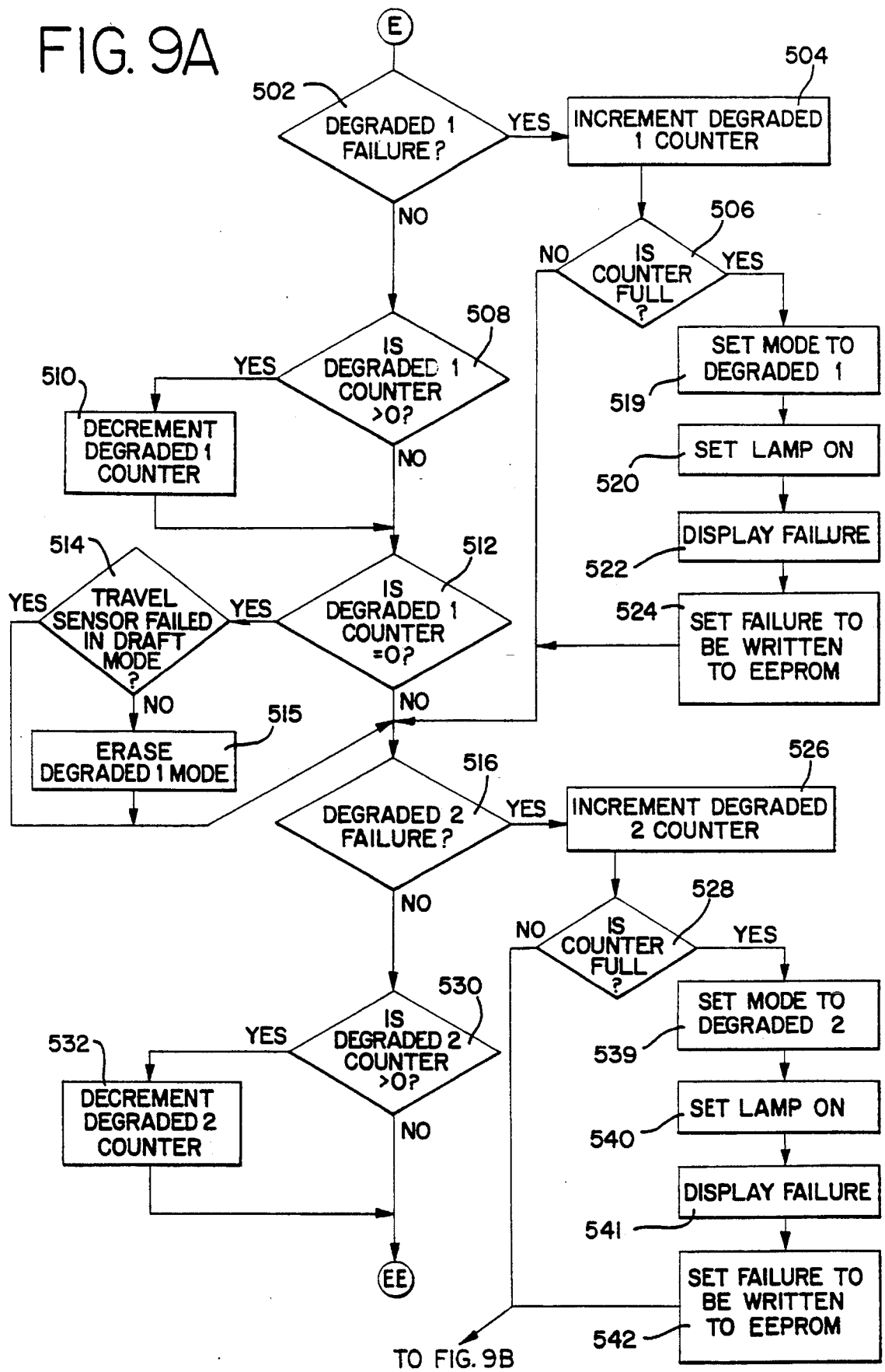
Figure 9B:
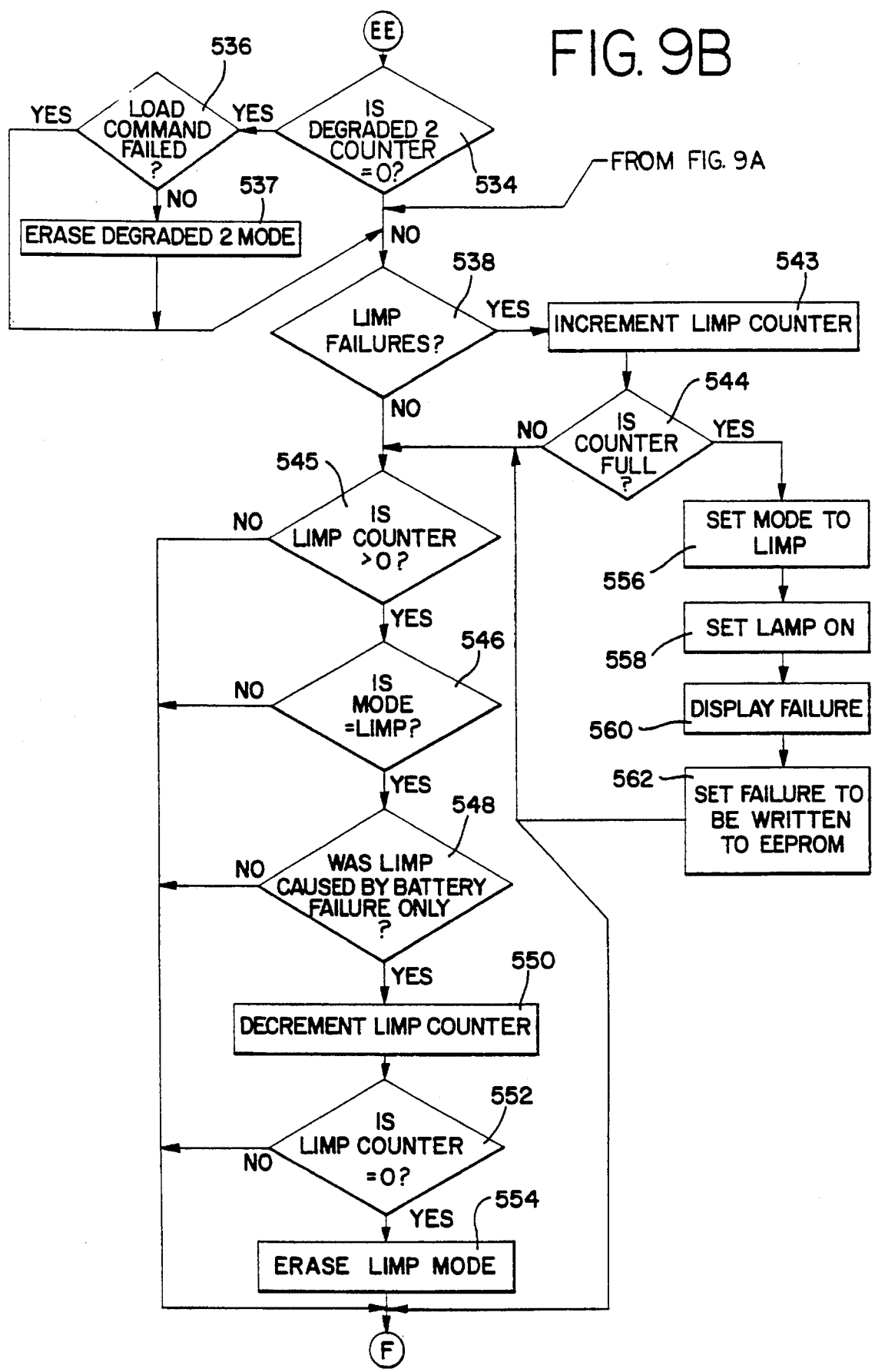

The steps involved with step 500 are schematically illustrated in FIGS. 9A and 9B. The error evaluation begins at step 502 to determine whether any of the inputs analyzed in step 400 are the equivalent of a DEGRADED 1 type failure. In the preferred embodiment, a DEGRADED 1 is the least severe error which allows the system to continue to operate, with the function that failed receiving a default value. Examples of DEGRADED 1 failures include one of the sensors 82 associated with the draft links 28 failing, the circuitry associated with the decent mechanism 92 failing, the circuitry associated with the response assembly 98 failing, etc.

If no DEGRADED 1 type failure is detected at step 502, the program shifts to step 508. However, if a DEGRADED 1 type failure is detected at step 502, the system shifts to step 504 whereas a software counter associated with DEGRADED 1 conditions is incremented. After incrementing the DEGRADED 1 counter, the system shifts to step 506 whereat an evaluation is made of whether the DEGRADED 1 software counter is full. If the DEGRADED 1 software counter is not full, the program shifts to step 516.

If at step 502, no DEGRADED 1 type failure is detected, the program advances to step 508. If at step 508 the count in the DEGRADED 1 counter is greater than zero, the program shifts to step 510 whereat the DEGRADED 1 counter is decremented. If the count in the DEGRADED 1 counter is not greater than zero, the program shifts to step 512 wherein the count of the DEGRADED 1 counter is again reviewed.

If the count in the DEGRADED 1 software counter at step 512 is equal to zero, the system shifts to step 514 to determine if the source of the failure is the travel knob or apparatus 96 in the Draft state. If the travel knob or apparatus 96 has failed, the system is shifted to step 516. On the other hand, if the travel knob 96 has not failed, the system is shifted to step 515 wherein the DEGRADED 1 mode of the system is erased and the system shifts to step 516. If the count in the DEGRADED 1 software counter at step 512 is not equal to zero, the system shifts to step 516.

On the other hand, if the DEGRADED 1 counter is full, step 506 directs the program to step 519 wherein the system is shifted into a DEGRADED 1 mode. As mentioned in a DEGRADED 1 mode, the system can continue to operate, however, the function that failed will receive a default value. After setting the system into a DEGRADED 1 mode, the indicator light 106 is set "ON" at step 520 to alert the operator to a disfunction or error. At step 522, the alphanumeric display 102 of the indicator assembly 100 is set to provide a visual indication of the errors. At step 524, the failure is set to be written to the EEPROM 58 (see step 804 in FIG. 12). From step 524, the program proceeds to step 516.

Step 516 is the first step in evaluation of a DEGRADED 2 mode. If the program detects that the hitch assembly is operable in a DEGRADED 2 situation, the DRAFT state (as described below) is disabled and the hitch assembly will be permitted to operate only in states other than Draft (as described below). The type of errors which constitute a DEGRADED 2 situation involve the failure of the circuitry associated with the draft force command mechanism 85 or that all the draft sensors 82 for measuring the draft force have failed. Alternatively, a DEGRADED 2 mode will be effected if the tractor is configured with single draft sensor and that draft sensor fails.

If no DEGRADED 2 type failure is detected at step 516, the program shifts to step 530. However, if a DEGRADED 2 type failure is detected at step 516, a DEGRADED 2 software counter is incremented at step 526. At step 528, an evaluation is made of whether the DEGRADED 2 counter is full. If the DEGRADED 2 counter is not full, the program is shifted to step 538. If at step 516 no DEGRADED 2 type failure is detected, the program advances to step 530, where an evaluation is made of whether the DEGRADED 2 counter has a count greater than zero. If the count in the DEGRADED 2 counter is greater than zero, the program is shifted to step 532 whereat the DEGRADED 2 counter is decremented. If the DEGRADED 2 counter does not have a count greater than zero, the program is shifted to step 534 (FIG. 9B) whereat an evaluation of whether the DEGRADED 2 counter is equal to zero. If the DEGRADED 2 counter is equal to zero, the system is shifted to step 536 wherein an evaluation is determined on whether the Circuitry associated with the draft command mechanism 85 has failed. If the circuitry associated with the draft force command mechanism 85 has failed, the system is shifted to step 538. If the circuitry associated with the draft force command mechanism 85 has not failed, the system is shifted to step 537 whereat the DEGRADED 2 mode of operation is cleared after which the program proceeds to step 538. However, if the DEGRADED 2 counter is not equal to zero, the system is shifted to step 538.

Returning to FIG. 9A, if the DEGRADED 2 software counter is full, step 528 directs the program into the DEGRADED. 2.mode at step 539. Thereafter, the indication light 106 is set ON at step 540 to alert the operator to an error and the alphanumeric display 102 on the indicator assembly is set to provide a visual indication of the DEGRADED 2 failure at step 541. At step 542, the failure is set to be Written to the EEPROM 58 and then the program shifts to step 538.

Returning to FIG. 9B, step 538 is the tint step in an evaluation of a LIMP error condition for the hitch assembly 20. If the program detects that the hitch assembly is operable in a LIMP condition, the POSITION, DRAFT, and HITCH UP states (described in detail below) for the hitch assembly 20 are disabled. The remote switches (34, 65 or the up/down switch assembly 90 in the tractor are, however, operable. Moving the switch assembly 90 into a DOWN M position, will cause timed movement of hitch assembly downwardly. Toggling of the switch assembly 90 between UP and DOWN positions will allow for timed movement of the hitch assembly in an upward direction. Whereas, if the remote switches 64, 65 are being used to elevationally position the hitch assembly 20, movement of the hitch assembly will continue only as long as the appropriate switch is held by the operator. The type of errors which are detected in step 400 and which constitute a LIMP condition for the hitch assembly involve failure of the circuitry associated with the hitch position command mechanism 66, or the circuitry associated with the hitch position sensor 78. Loss of the constant voltage regulator or battery voltage less than a minimum voltage (e.g.) will likewise shift the program into a LIMP condition. Other faulty conditions for the hitch assembly will likewise shift the control unit into a LIMP condition.

If a LIMP type error is detected at step 538, a LIMP software counter is incremented at step 543. At step 544 an evaluation is made whether the LIMP counter is full As will be appreciated, the numerical count which constitutes a "full" LIMP counter is less than that numerical count used to shift the control System for the hitch assembly into a DEGRADED 2 or a DEGRADED 1 mode. If the LIMP counter is not full, the program is shifted to step 602.

If at step 538 no LIMP type error is detected, the program advances to step 545. At step 545 an evaluation is made of whether the count in the LIMP counter is greater than zero. If the count in the LIMP counter is not greater than zero, the program is shifted into step 602 (FIG. 10) to determine the state of operation for the hitch assembly 20. If the count in the LIMP counter is greater than zero, the program for the control unit 42 shifts to step 546 whereat an evaluation is made on whether the hitch assembly is operable in a LIMP mode.

If a determination is made at step 546 that the hitch assembly is not operable in a LIMP mode, the program shifts to step 602 whereat the appropriate mode of operation is determined. If the determination at step 546 is that the hitch assembly is operated in a LIMP mode, the program shifts to step 548 whereat a determination is made on whether the LIMP error was caused by a failure of battery 18. If the error which caused the program to shift into a LIMP mode was not caused by a failure of battery 18, the program is shifted into step 602 to determine the appropriate state of operation. If the error which shifted the system into a LIMP mode was caused by battery failure only, step 548 directs the program to decrement the LIMP counter at step 550.

After the LIMP counter has been decremented, at step 552 the count in the LIMP counter is again evaluated. If the count in the LIMP counter is not equal to zero, the program is shifted to determine the appropriate state of operation at step 602. On the other hand, if the count in the LIMP counter is equal to zero, the program is shifted into step 554 which erases the LIMP mode and shifts the program into step 602 to determine the state of operation. As will be appreciated, the LIMP mode is erasable only upon correction of battery failure.

Returning to step 544, if the LIMP counter is full, the program shifts to step. 556 wherein the hitch assembly is set to operate in a LIMP mode. After setting the hitch assembly to operate in a LIMP mode at step 558, the indicator lamp 106 is set to ON to alert the operator to a failure condition in the program or system. At step 560, the alphanumeric display 102 on the indicator assembly 100 provides a visual indication of the error causing the hitch assembly to operate in a LIMP mode. At step 562, the error is set to be written to the EEPROM 58 and then the program shifts to step 602.

As a result of the steps involved in the error evaluation step 500 (FIG. 6), a continuous evaluation of the hitch assembly operativeness is provided approximately ever 10 milliseconds. After evaluating whether there are errors and categorization of the errors as either DEGRADED 1 or DEGRADED 2 or LIMP, the program proceeds to step 600. At step 600, the program determines the mode and state of operation for the hitch assembly 20. In the preferred embodiment, the hitch assembly is operable in any one of a plurality of states including: ENABLE; POSITION; DRAFT: HITCH UP; and MOMENTARY ACTUATION.

The ENABLE state is set for the hitch assembly when the following conditions exist. The elevational position of the hitch assembly as sensed by the sensor 78 (FIG. 1) is not within a predetermined range of where the sensors had previously detected the hitch assembly to be during the initialization step 200 of the program. An ENABLE state is appropriate when the elevational position of the hitch assembly as sensed by the sensor 78 is not within a predetermined range of the upper limit setting immediately after the initialization step 200 has been completed and the up/down switch assembly is positioned LIMP. In those hitch assemblies so equipped, the program is shifted to an ENABLE state when there is a transition between the remote switch assembly 63 being active and the remote switch assembly 63 being not active. After the initialization step has been completed, the program shifts to an ENABLE state. If hitch assembly is operating in a LIMP mode and the up/down switch assembly 90 is toggled, the program shifts to an ENABLE state upon return of the switch assembly 90 to a DOWN position. In the preferred embodiment, and upon starting of the tractor or after actuation of the tractor, the system must shift to an ENABLE state before hitch actuation can be accomplished. To operate the remote switch assembly 63, however, the system need not be in an ENABLE state. The conditions schematically illustrated in steps 602,606 and 610 (FIG. 10) likewise cause a transition to the ENABLE state.

In the POSITION state, the hitch assembly 20 is commanded only by the hitch command mechanism 66. In this state, the hitch assembly 20 will elevationally move until the actual hitch position is within a predetermined range of the setting for the operator controlled mechanism 68 of the hitch command mechanism 66.

In the DRAFT state, the hitch assembly 20 is commanded to maintain a substantially constant draft and toward this end is permitted to elevationally move within predetermined limits.

In a HITCH UP state, the hitch assembly is commanded under the influence of the up/down switch assembly 90. The hitch assembly 20 will move upwardly when the switch assembly 90 is set in an UP position. In this state, the hitch assembly will be permitted to move up to the upper limit set by the upper limit knob 94 or to the maximum upper limit of the hitch assembly if knob 94 does not exist.

In a MOMENTARY ACTUATION state, the hitch assembly 20 is commanded to move under the influence of the remote switch assembly 63 or the up/down switch assembly 90 in LIMP mode. Notably, the hitch assembly 20 will continually move either up or down at a constant rate under the influence of the remote switch assembly 63 whereas the hitch assembly 20 will move at a constant rate for predetermined segmented periods of time (approximating 2 seconds each) when operating in a LIMP mode and under the influence of the switch assembly 90.

Figure 10:
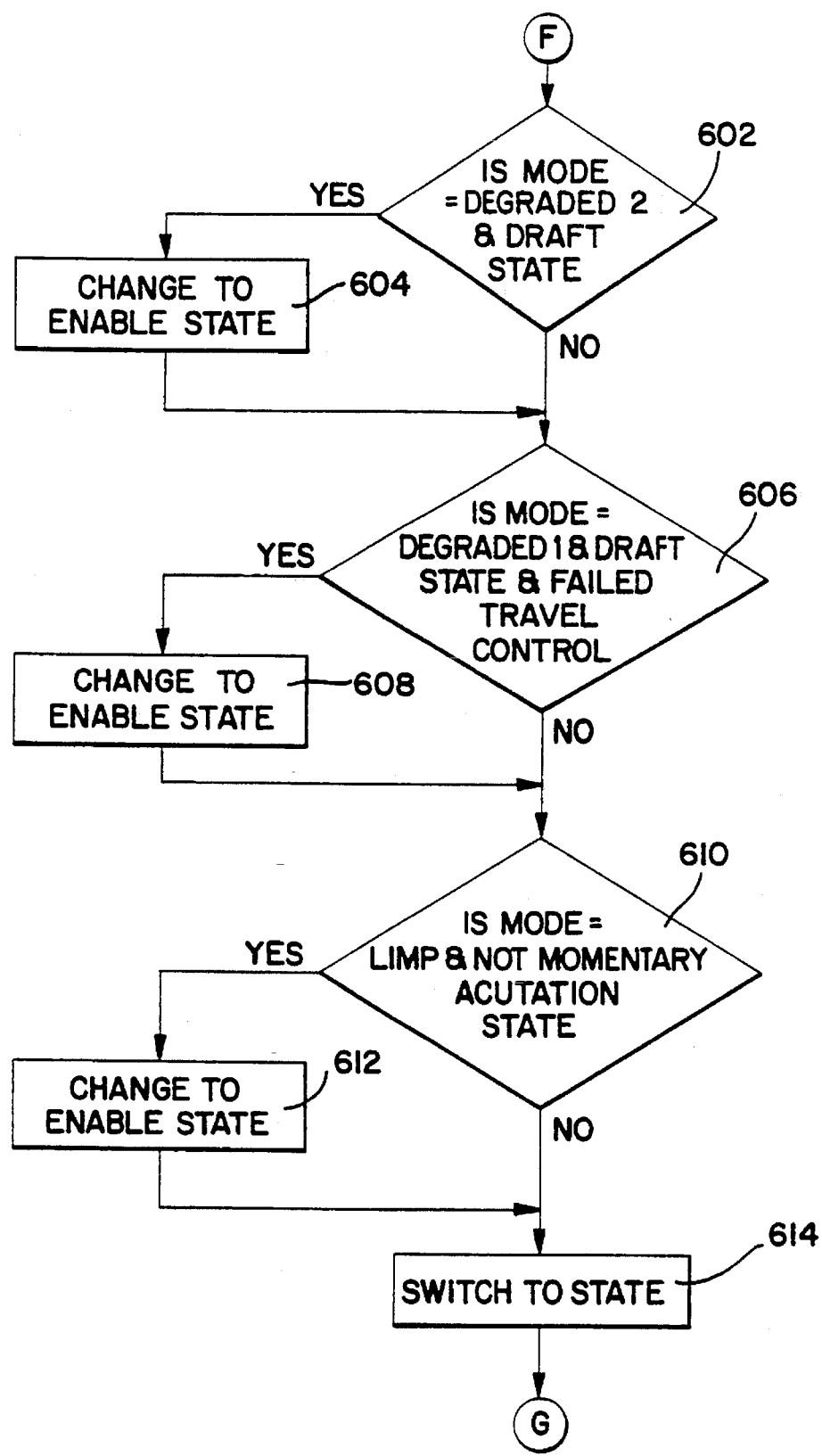

The steps involved with step 600 are schematically represented in FIGURE 10. Determination of which state is suited for the hitch assembly 20 begins at step 602. At step 602, an evaluation is made whether DEGRADED 2 was activated during step 500 and whether the program has been operating in a DRAFT state setting. If DEGRADED 2 was activated during step 500 and the hitch assembly was operating in a DRAFT state, the program is shifted to step 604 which conditions the program to operate the hitch assembly 20 in an ENABLE state. If conditions for step 602 are not satisfied, the program is shifted to step 606. Notably after the program has shifted to an ENABLE state at step 604, the program is directed to step 606.

At step 606, an evaluation is made whether DEGRADED 1 mode was activated during step 500 and whether the hitch assembly was operating in a DRAFT state and whether the electric circuitry or any other aspect associated with the travel apparatus 96 has failed. If a DEGRADED 1 was activated during step 500 and the hitch assembly was operating in a DRAFT state and if any aspect of the travel apparatus is faulty, step 606 directs the program to step 608 which conditions the hitch assembly into an ENABLE state of operation. On the other hand, if conditions of step 606 are not met, the program shifts to step 610. Notably, after the program has shifted to an ENABLE state at step 608, the program is directed to step 610.

At step 610, an evaluation is made whether the LIMP mode was activated in step 500 and whether the remote switches 64, 65 for vertically moving the hitch assembly are currently not being operated. If the LIMP mode was activated during step 500 and the remote switches 64, 65 are not being used to vertically move the hitch assembly, the program is shifted to step 612 which also conditions the hitch assembly into an ENABLE state. If conditions of step 610 are not met, the program is shifted to step 614 which allows the hitch assembly to operate in the same state to which it was conditioned prior to step 600. Notably, after the program has shifted to an ENABLE state at step 612, the program will shift to step 614.

Various operator settings sensed during operation of the hitch assembly 20 permits the program of the control unit 42 to identify the particular state of operation for the hitch assembly 20 and the control objectives. FIG. 3 11A through 11E schematically represent transition diagrams which allow the state of operation of the hitch assembly to switch or change from one state to another state depending upon the particular sensed settings for the hitch assembly 20.

FIG. 11A schematically illustrates those steps which will allow the program for the hitch assembly to switch or transition from an ENABLE state to either: a HITCH UP state: a POSITION state; a MOMENTARY ACTUATION state: or remain in an ENABLE state. As shown in FIG. 11A, the first step 702 in the transition process from an ENABLE state involves determining whether the tractor 10 is stopped and whether either of the remote switches 64, 65 is being operated. If the ground speed sensor 88 indicates that the tractor 10 is stopped and either of the remote switches 64 or 65 is being actuated, the program then shifts to step 704 which changes the state of operation for the hitch assembly into the MOMENTARY ACTUATION state upon the next timed loop or cycle of the program. On the other hand, if the conditions of step 702 are not met, the program is directed to step 706.

At step 706 an evaluation is made whether the tractor 10 is stopped and either the switch assembly 90 is toggled between UP and DOWN or positioned DOWN M to elevationally position the hitch assembly 20 and whether the LIMP mode was activated. If all the conditions evaluated at step 706 are satisfied, the program shifts to step 704 such that the state of operation for the hitch assembly shifts to the MOMENTARY ACTUATION state upon the next timed loop of the program. If the conditions of step 706 are not satisfied, the program of the control unit is shifted to step 708.

At step 708, evaluations are made whether the up/down switch assembly 90 is in an UP position and a software hitch enable flag, to be set in step 716, indicates whether the upper limit assembly 94 is set to be within a predetermined range of the elevation of the hitch assembly draft links 28 so as to enable the hitch assembly. If the evaluations at step 708 are satisfied, the program shifts to step 710 such that the state of operation for the hitch assembly shifts or transitions to the HITCH UP state of operation upon the next timed loop of the program. If the evaluations considered at step 708 are not satisfied, the program shifts to step 712.

At step 712, evaluations are made whether the up/down switch assembly 90 is DOWN and whether the adjustable mechanism 68 associated with the operator command mechanism 66 is set to be within a predetermined range of the elevation of the hitch assembly draft links 28 so as to enable the hitch assembly 20. If the conditions analyzed at step 712 are satisfied, the program shifts to step 714 so that the state of operation of the hitch assembly shifts or transitions to a POSITION state upon the next timed loop of the program. If the conditions analyzed at step 712 are not satisfied, the program shifts to step 716.

At step 716, an evaluation is made whether the hitch assembly is enabled. For details concerning the algorithm associated with step 716, the reader is kindly referred to the computer program listing contained in the appendix attached hereto and forming pan hereof. If it is determined that the hitch assembly 20 is enabled, a software hitch enable flag, which was initialized in step 266 (FIG. 7C), will be set. If the hitch enable flag is set, upon the next timed loop, the program will be shifted to either step 710 or 714 to shift the program to either a HITCH UP state or a POSITION state depending upon the position of the switch assembly 90.

Step 720 of the program conditions the indicator fight 106 into a FLASHING mode if there is no LIMP failure. The FLASHING mode of the indicator fight 106 provides a visual indication that the system is not enabled and the operator is required to positively act before the hitch assembly could be elevationally moved.

Figure 11B:
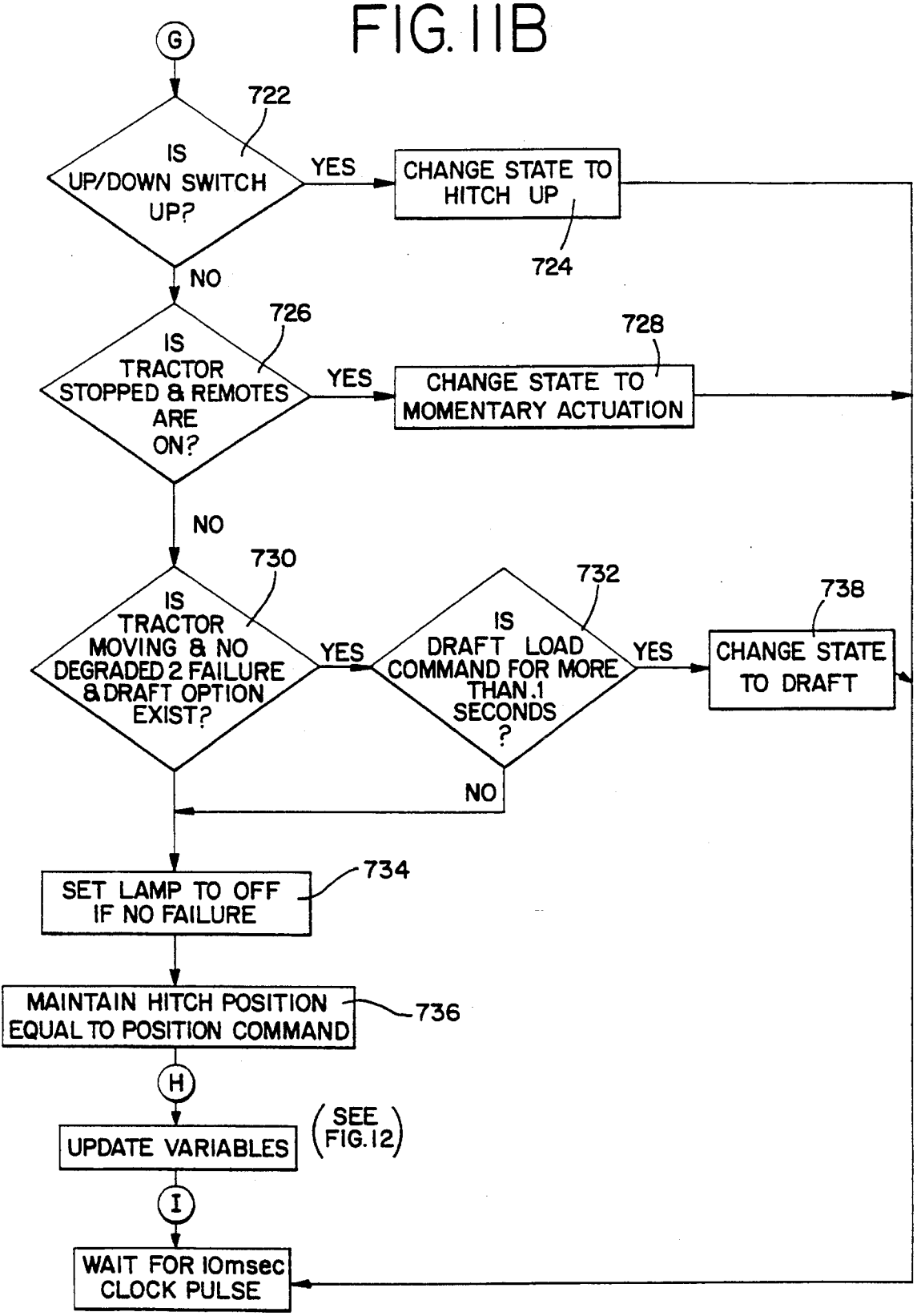

FIG. 11B schematically illustrates those steps which will allow the program for the hitch assembly to switch or transition from a POSITION state to either; a HITCH UP state: a MOMENTARY ACTUATION state; or to a DRAFT state. As schematically represented in FIG. 11B, the initial step 722 in the transition process from the POSITION state involves a determination of whether the up/down switch assembly 90 is positioned in an UP position. If the switch assembly 90 is positioned in an UP position, the program shifts to step 724 which changes or shifts the state of operation for the hitch assembly to the HITCH UP state upon the next timed loop of the program. Alternatively, if the switch assembly 90 is not positioned in the UP position, step 722 directs the program to step 726.

At step 726, an evaluation is made whether the tractor 10 is stopped and whether either of the remote switches (34, 65 are actuated. If the tractor 10 is stopped and either of the remote switches 64.65 are actuated, the program shifts to step 728 such that the state of operation for the hitch assembly shifts or transitions to a MOMENTARY ACTUATION state of operation upon the next timed loop of the program. If the evaluations considered at step 726 are not satisfied, the program shifts to step 730.

At step 730, an evaluation is made whether the tractor 10 is moving as detected by the sensor 88 and that the DEGRADED 2 mode was not activated in step 500 and that a DRAFT state of operation is configured on the tractor. If the conditions evaluated at step 730 are satisfied, the program is directed to step 732. If each of the conditions evaluated at step 730 are not satisfied, the program is directed to step 734. At step 734, the program directs the indicator lamp 106 to be OFF if there have been no failures of the system.

From step 734, the program is directed to step 736. At step 736, the program directs the control unit 42 to maintain the elevational position of the hitch assembly 20 equal to the position set for the hitch assembly as a function of the position of the adjustable mechanism 68 of the hitch command mechanism 66. For details concerning the algorithm associated with step 736, the reader is kindly referred to the computer program listing contained in the appendix attached hereto and forming part hereof.

Returning to step 732, an evaluation is made whether the draft load as sensed by the draft load sensor assembly 80 is greater than the draft load set by the operator on the draft force command mechanism 85 as measured-by the potentiometer 86 (FIG. 4). In a preferred embodiment of the invention, step 732 further analyzes whether the draft force sensed by the sensor assembly 80 is greater than that sensed by the command mechanism 85 for a specified period of time which, in the illustrated embodiment, is greater than 0.1 seconds. If the conditions analyzed in step 732 are satisfied, the program shifts to step 738 such that the state of operation of the hitch assembly transitions from the POSITION state of operation to the DRAFT state of operation upon the next timed loop of the program. On the other hand, if the conditions analyzed in step 732 are not satisfied, that is, the draft load as sensed by the draft load sensor assembly 80 does not exceed the setting of the draft force command mechanism 85 for the specified period of time, the program shifts from step 732 to step 734 and the program proceeds as discussed above without changing the POSITION state operation.

Figure 11C:
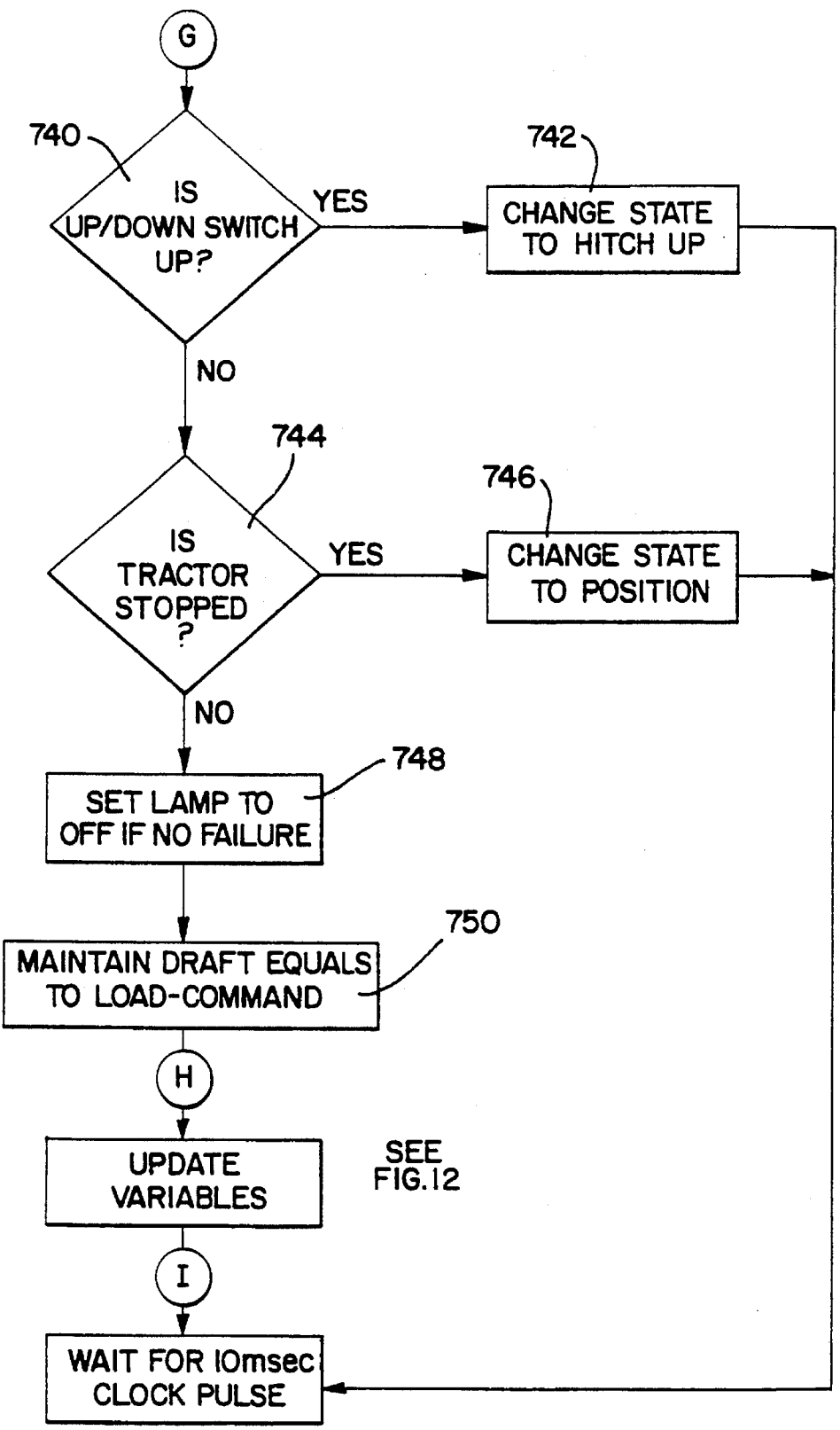

FIG. 11C schematically illustrates those steps which allow the program for the hitch assembly to switch or transition from the DRAFT state to either: the HITCH UP state; or the POSITION state. As schematically represented in FIG. 11 C, the initial step 740 in the transition process from the DRAFT state involves a determination of whether the up/down switch assembly is positioned UP. If the switch assembly 90 is positioned UP, the program shifts to step 742 such that the state of operation for the hitch assembly shifts or transitions to the HITCH UP state upon the next timed loop of the program. On the other hand, if the up/down switch assembly 90 is not positioned LIP, the program is directed to step 744.

At step 744, an evaluation is made of whether the tractor 10 is stopped. If the ground speed sensor 88 or other suitable device provides a signal indicating that tractor 10 is stopped, the program shifts to step 746 such that the state of operation for the hitch assembly shifts or changes to the POSITION state of operation. If the tractor is not stopped, however, the program immediately shifts to step 748 and the hitch assembly remains in the DRAFT state of operation during the consecutive timed loop of the program.

At step 748, the program directs the indicator light to be OFF if there have been no failures. With the indicator light OFF, the operator is provided with a visual indication that the system remains operational to elevationally position the hitch assembly. From step 748, the program is directed to step 750.

A salient feature of the present invention concerns the ability of the control unit 42 to maintain a substantially constant load on the hitch assembly 20 during operation of the implement attached to the hitch assembly 20. Effecting such ends is accomplished during the DRAFT state at step 750. At step 750, the program operates under a separate control algorithm the operation of which is discussed in further detail below (see FIG. 13). For more details concerning the control algorithm used at step 750 during the DRAFT state, the reader is kindly directed to the computer program listing contained in the appendix attached hereto and forming a part hereof.

Figure 11D:
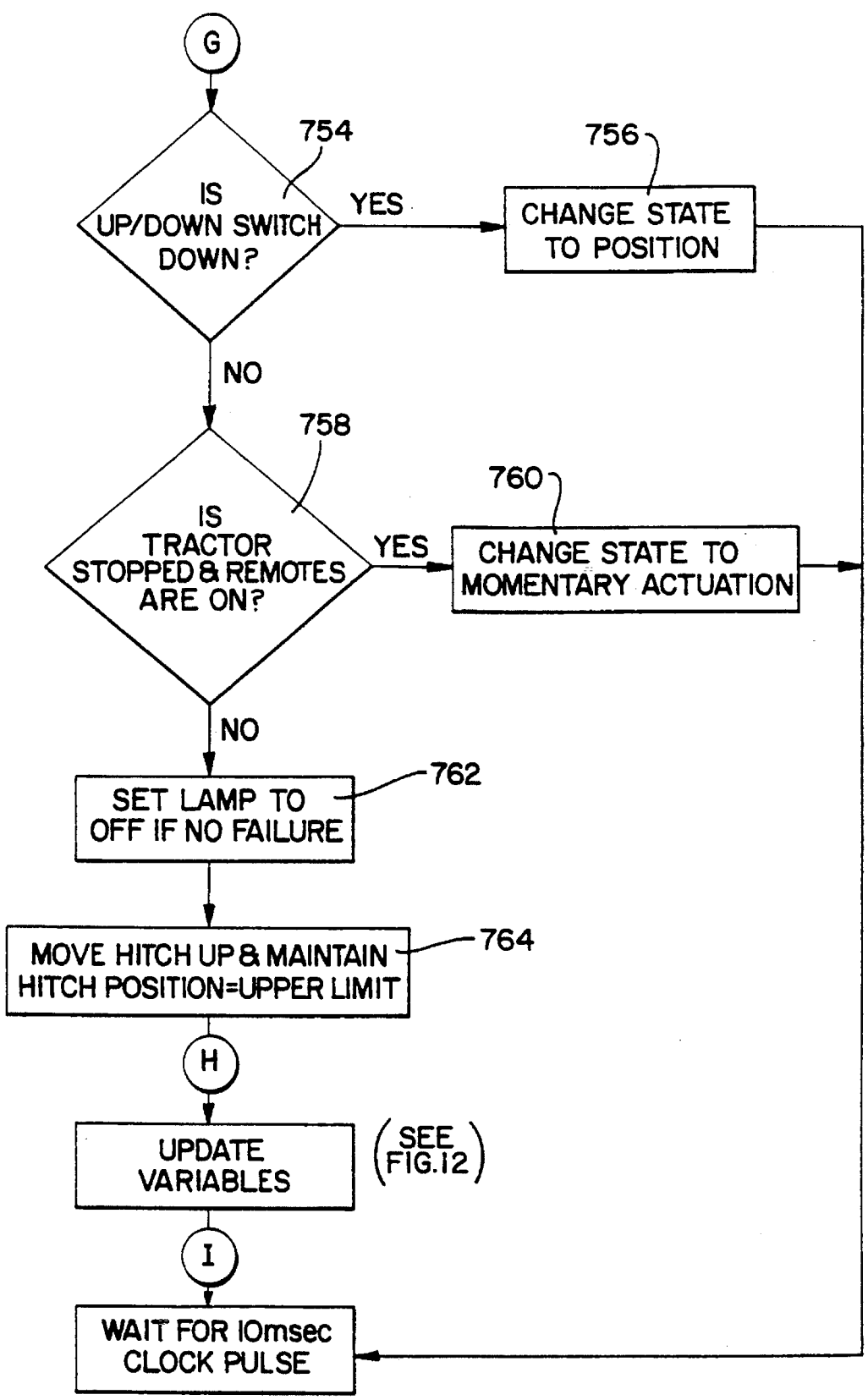

FIG. 11D schematically illustrates those steps which allow the program for the hitch assembly to switch or transition from a HITCH UP state to either: a POSITION state of operation; or a MOMENTARY ACTUATION state of operation. As schematically represented in FIG. 11D, the initial step 754 in the transition process from the HITCH UP state of operation involves a determination of the position of the up/down switch assembly 90. If the switch assembly 90 is positioned DOWN, the program shifts from step 754 to step 756. Step 756 permits the state of operation of the hitch assembly to shift from the HITCH UP state to the POSITION state upon the next timed loop of the program. On the other hand, if the switch assembly 90 is positioned UP, step 754 directs the program to step 758.

At step 758, an evaluation is made whether the tractor is stopped and whether either of the remote switches 64, 65 are being used to elevationally position the hitch assembly. If the tractor is stopped and either of the remote switches are being used, the program shifts to step 760 such that the state of operation for the hitch assembly shifts or transitions to the MOMENTARY ACTUATION state upon the next timed loop of the program. If the conditions analyzed in step 758 are not satisfied, the program shifts to step 762 and the hitch assembly remains in the HITCH UP state of operation upon the next timed loop of the program.

At step 762, the program directs the indicator fight to be turned OFF if there have been no failures. Turning the indicator light 106 OFF provides a visual indication to the operator that the hitch assembly is operating without failure. From step 762, the program shifts to step 764.

At step 764, the program of the control unit 42 causes the hitch assembly to vertically move upwardly. The upward vertical movement of the hitch assembly continues until the hitch reaches the upper limit of its travel. The upper limit of hitch movement can either be determined from the configuration of the hitch assembly or by the operator selected setting of the upper limit knob or apparatus 94 (FIG. 4). After the hitch assembly reaches the upper limit of its travel, the program maintains the hitch assembly in the upper limit position for transportation purposes and the like.

FIG. 11E schematically represents those steps which will flow the program for the hitch assembly to switch or transition form a MOMENTARY ACTUATION state to an ENABLE state. As schematically illustrated in FIG. 11E, the initial step 766 in the transition process from the MOMENTARY UP state involves a determination of whether the tractor 10 is stopped or whether either of the remote switches 154, 65 are being used to elevationally position the hitch assembly or the switch assembly is not toggled between UP and DOWN and is not positioned DOWN M and the hitch assembly is not in a LIMP mode. If the conditions evaluated at step 766 are satisfied, the program shifts to step 768 so that the state of operation of the hitch assembly shifts or transitions to the ENABLE state of operation upon the next timed loop of the program.

On the other hand, if the conditions specified in step 766 are not satisfied, the program shifts to step 770 whereat an algorithm for elevationally moving the hitch assembly at a constant rate is executed or implemented. For more details concerning the algorithm associated with step 770, the reader is kindly referred to the computer program listing contained in the appendix attached hereto and forming a part hereof.

At step 772, the program directs the indicator lamp 106 into a FLASHING mode if there have been no failures. The FLASHING mode of the indicator lamp 106 provides a visual indication to the operator that the system is not enabled and the operator is required to positively act before the hitch assembly will elevationally move.

Figure 12:
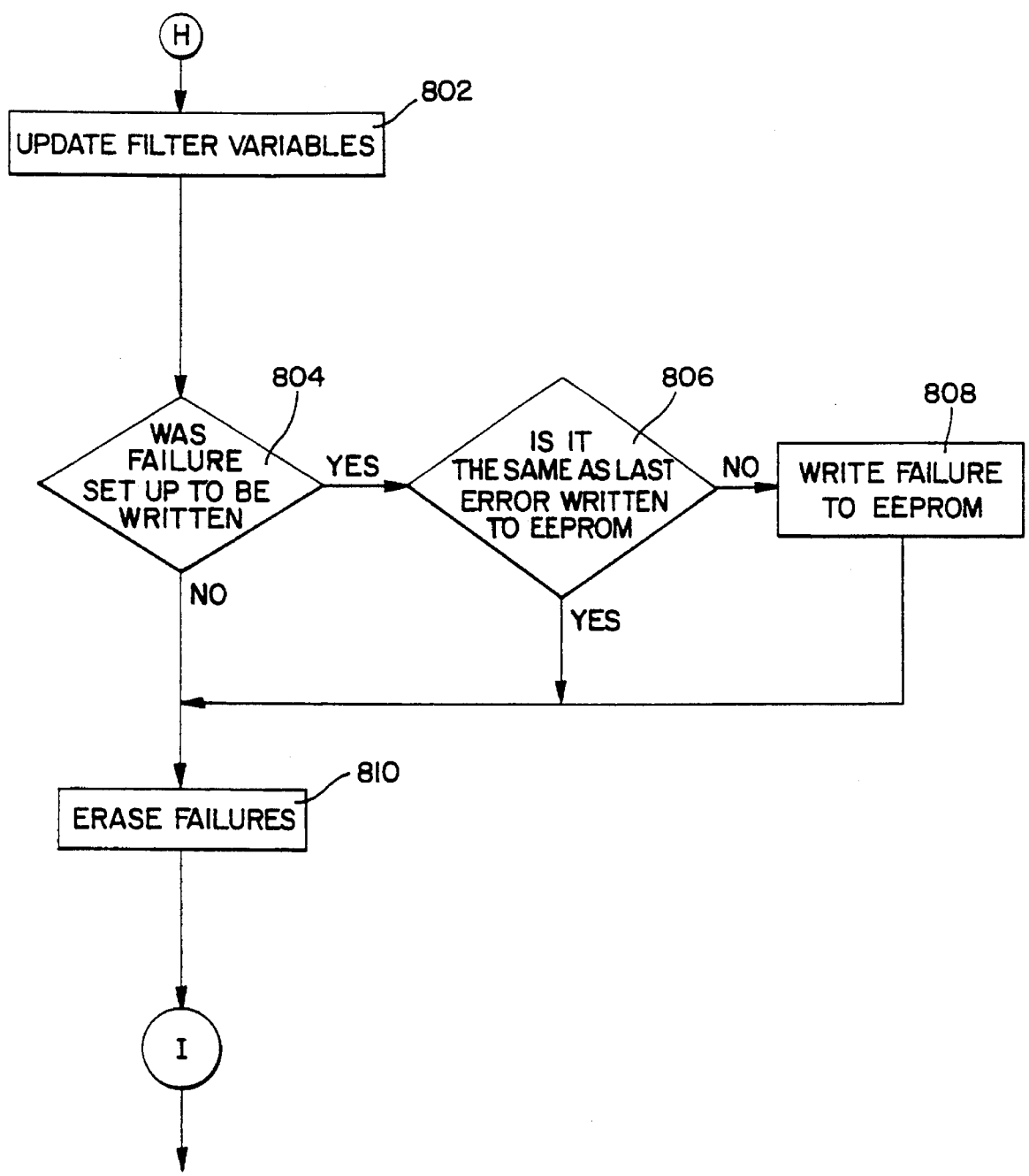

FIG. 12 schematically illustrates the final process involved in a complete timed loop of the program for the hitch assembly. As was discussed in detail above, during each timed loop of the program, the control unit is passed through a series of steps to determine and identify the particular state of operation for the hitch assembly 20 and to effect the desired control objectives. In the illustrated embodiment, and so as to update the variables associated with the hitch assembly prior to commencement of a subsequent timed loop or cycle, after the program is shifted or transitioned to the appropriate state for hitch assembly operation and before the expiration of the timed loop cycle, the program is passed through steps 802 through 810.

Step 802 involves updating variables such as hitch position and the setting for the operator command mechanism 66. These variables are used in filtering algorithms of the program for which past data needs to be updated. In step 804, an evaluation is made as to the existence of failures in the system that are set to be written to the EEPROM 58 (see for example step 524 or step 546 in FIGS. 9A, and step 562 in FIG. 9B). If a failure set to be written exists, the program is shifted to step 806.

At step 806, the failure is checked against the last failure written to the EEPROM 58. If the failure was not written as a last failure, the failure is written into the EEPROM 58 at step 808. Thereafter, the program is shifted to step 810. On the other hand, if the failure is the same as the last failure written to the EEPROM 58, the program is shifted to step 810. Notably, if the evaluation at step 804 determines that there are no failures to be written in the system, the program shifts to step 810.

At step 810, the failures that were detected during the previous timed loop or cycle are erased so that if they continue to exist they can be detected and counted in the next timed loop or cycle of the program. From step 810, the program transitions into a loop awaiting to be interrupted by the clock pulse which shifts and returns the program to step 300 (FIG. 6) for commencement of the next timed loop or cycle.

Figure 13:
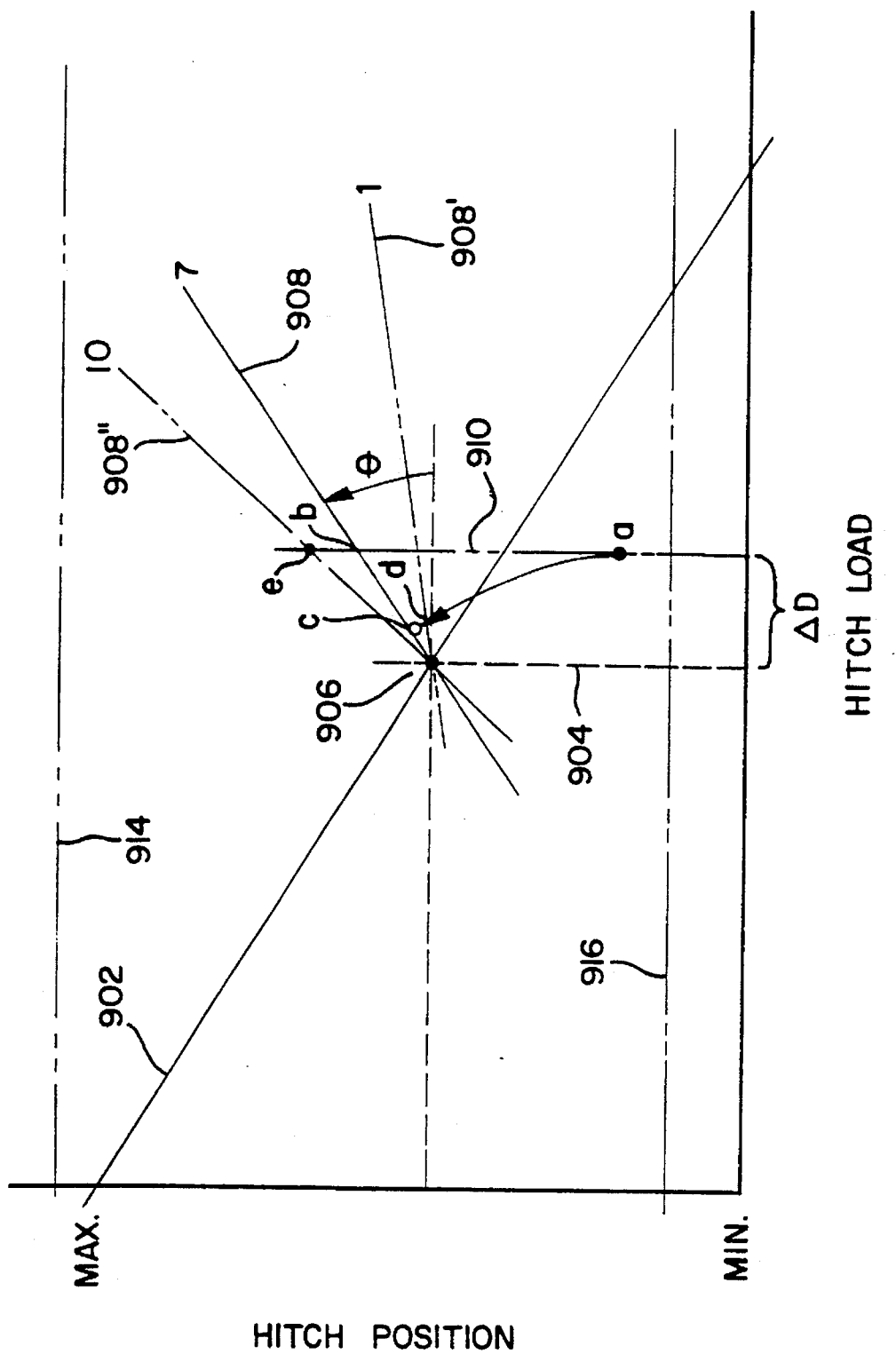
FIG. 13 is a graphic illustration of how the control system operates when conditioned for a DRAFT state of operation.

A salient feature of the present invention concerns operation of the hitch assembly in a DRAFT state. At schematic representation of hitch assembly operation in the DRAFT state is provided in FIG. 13. As shown in FIG. 13, line 902 represents a load-line which schematically relates the elevational position of the hitch assembly 20 to the draft force or load applied to the hitch assembly 20. Line 904 schematically represents the setting of the draft force command mechanism 85 as selected by the operator. As will be appreciated, the location 906 whereat the draft force setting selected by the operator intersects the load line 902 is functionally related to the elevational position or depth of the hitch assembly. Line 908 schematically represents the setting selected by the operator for the travel knob or apparatus 96. Notably, apparatus 96 is adjustable through a range of positions or settings. Each setting on the travel knob 96 provides a different slope or angle θ to line 908. As an example, a setting of "1" on the travel knob 96 will provide a different slant to the line as shown by line 908' than will a setting of "10" as shown by line 908". Line 910 on FIG. 13 indicates an actual draft load being placed on the hitch assembly as measured by sensors 82.

In a DRAFT state, and in the example being used for purposes of this description, the control unit 42 will detect that there is a difference between the actual draft force or load being applied to the hitch assembly 20 as detected by the sensors 82 and the desired draft force or load as set by the draft force command mechanism 85. The control unit 42, therefore, will control the actuator 30 to move the hitch assembly 20 to seek an equilibrium. In the example illustrated in FIG. 13, the control unit 42 will cause the actuator 30 to elevate the hitch assembly 20 from a point "a" until the draft force, intersects with the line 908 representative of the setting for the travel knob 96 at point "c" and assuming that the difference between the actual draft load or force applied to the hitch assembly as a result of ground/implement interaction and the setting of the travel assembly 96 would not change or vary. As will be appreciated, if the travel knob 96 were set to "1" rather than that shown the actuator 30 would be operated until the hitch position, as indicated by sensor assembly 78, will intersect line 908' at point "d". Theoretically, if the draft load did not change as a function of the position of the equipment within the ground, the position of the hitch assembly would move linearly from point "a" to point "b". Similarly, if the travel knob 96 were set to "10", the actuator 30 would be operated until the hitch position intersected with line 908" at point "e". As will be appreciated by those skilled in the art, however, as the hitch assembly rises under the influence of the actuator 30, the actual draft load applied to the hitch assembly will decrease and, thus, the ultimate load placed on the hitch assembly will be closer to the point "c". A unique feature of the present invention is the ability to independently adjust the travel of the hitch assembly during the DRAFT state to achieve those results most beneficial for the operator.

Another unique advantage of the present invention concerns the provision of the response assembly 98. As mentioned above, the purpose of the response assembly 98 is to control the response rate over which the hitch assembly vertically moves during operation of the implement attached to the hitch assembly. In the example illustrated in FIG. 13, the response rate concerns the amount of time over which the hitch assembly will rise as it vertically moves between points "a" and "c". As will be appreciated by those skilled in the art, the ability to independently control the response time of the hitch assembly provides the operator with a smoother ride and avoids overloading of the tractor engine as the vertical position of the hitch assembly changes from one depth to another.

As mentioned above, the control system of the present invention permits the hitch assembly 20 to operate between upper and lower limits. The upper limit of hitch assembly is schematically illustrated in FIG. 13 by line 914. The lower limit of hitch assembly operation is schematically illustrated in FIG. 13 by line 916. Setting the upper limit inhibits damage to the tractor when the hitch assembly is raised to its extreme upper position. An advantage of the present invention is that during a DRAFT state, the control system of the present invention will control the actuator 30 in a manner preventing the hitch assembly from going beneath the lower limit represented by line 916.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A control system for controlling elevation of a hitch assembly supported on a vehicle and adapted to be coupled to an implement, the hitch assembly including an actuator for moving the hitch assembly through a range of positions in response to control signals, the control system comprising:

a first sensor supported by the vehicle configured to detect a parameter indicative of ground speed of the vehicle;

a remote control switch external from an operator station, the remote control switch being operable by an operator to command movement of the hitch assembly; and a control circuit coupled to the sensor and to the remote control switch, the control circuit being configured to permit movement of the hitch assembly by actuation of the remote control switch when the sensor indicates a vehicle speed below a threshold speed and to prevent movement of the hitch assembly in response to actuation of the remote control switch when the sensor indicates a vehicle speed above the threshold speed.

2. The control system of claim 1, wherein the remote control switch is a momentary contact switch.

3. The control system of claim 1, wherein the remote control switch is mounted on a rear portion of the vehicle outside of a vehicle cab.

4. The control system of claim 1, wherein the sensor is includes a radar unit for transmitting and receiving radar signals.

5. The control system of claim 1 wherein the control circuit includes a programmed microprocessor.

6. The control system of claim 1, wherein the control circuit permits movement of the hitch assembly in response to actuation of the remote control switch when the vehicle is stopped and prevents movement of the hitch assembly in response to actuation of the remote control switch when the vehicle is not stopped.

7. A control system for controlling elevation of a hitch assembly supported on a vehicle and adapted to be coupled to an implement, the hitch assembly including an actuator for moving the hitch assembly through a range of positions in response to control signals, the control system comprising:

a ground speed sensor configured to detect ground speed of the vehicle and to generate a ground speed signal representative thereof;

a manual hitch raise and lower switch assembly, the switch assembly being operator movable for commanding raising and lowering of the hitch assembly; and a control circuit coupled to the ground speed sensor and to the switch assembly, the control circuit being configured to compare the ground speed signal to a threshold speed signal and to generate control signals for commanding movement of the actuator to raise and lower the hitch assembly in response to actuation of the switch assembly based upon a predetermined relationship between the ground speed signal and the threshold speed signal.

8. The control system of claim 7, wherein the control circuit permits movement of the hitch assembly in response to actuation of the switch assembly when the ground speed signal is the threshold speed signal, and prevents movement of the hitch assembly in response to actuation of the switch assembly when the ground speed signal is below the threshold speed signal.

9. A control system for controlling elevation of an implement coupled to a hitch assembly of a type including an implement support structure and an actuator coupled to the support structure for moving the implement in response to control signals, the control system comprising:

means for detecting a parameter representative of vehicle speed and for producing a vehicle speed signal representative thereof;

means for manually commanding movement of the hitch assembly; and means for preventing movement of the hitch assembly in response to actuation of the commanding means when the vehicle speed signal produced by the detecting means based upon a predetermined relationship between the vehicle speed signal and a reference speed signal.

10. The control system of claim 9, wherein the reference speed signal corresponds to a vehicle speed of substantially zero.

11. The control system of claim 9, wherein the means for manually commanding movement of the hitch assembly includes a remote switch assembly supported outside a vehicle cab.

12. A control system for controlling an elevation of a hitch assembly supported on a vehicle and adapted to be coupled to an implement, the hitch assembly including an actuator for moving the hitch assembly through a range of positions in response to control signals, the control system comprising:

a first sensor configured to detect a parameter indicative of draft force resulting from interaction of the implement with the ground and to generate a draft signal representative thereof;

a second sensor configured to detect a parameter indicative of elevation of the implement and to generate a position signal representative thereof;

a third sensor configured to detect a parameter indicative of ground speed of the vehicle and to generate a speed signal representative thereof;

a first operator input device configured to generate a reference draft signal;

a second operator input device configured to generate a reference position signal; and a control circuit coupled to the first, second and third sensors and to the first and second input devices, the control circuit being configured to receive and process the draft, position, reference draft and reference position signals and to generate control signals for raising and lowering the hitch assembly based thereon, the control circuit comparing the speed signal to a reference speed signal and disabling movement of the hitch assembly based upon the draft and reference draft signals based upon a predetermined relationship between the speed and reference speed signals.

13. The control system of claim 12, wherein the control circuit is configured to control hitch assembly position in a plurality of control modes, including a draft mode and a position mode, and wherein control in the draft mode is disabled based upon the predetermined relationship between the speed and reference speed signals.

14. The control system of claim 13, wherein control in the draft mode is disabled when the vehicle is stopped.

15. The control system of claim 12, wherein the reference speed signal corresponds to a vehicle speed of substantially zero.

16. The control system of claim 12, wherein control based on the draft and reference draft signals is disabled when the speed signal exceeds the reference speed signal.

17. The control system of claim 16, wherein control based on the draft and reference draft signals is enabled when the speed signal is substantially equal to the reference speed signal.

18. A control system for controlling the elevation of a hitch assembly supported on a vehicle and adapted to be coupled to an implement, the hitch assembly including an actuator for moving the hitch assembly through a range of positions in response to control signals, the control system comprising:

means for detecting a first parameter representative of vehicle speed and for generating a vehicle speed signal representative thereof;

means for detecting a second parameter representative of draft force resulting from implement/ground interaction and for generating a draft signal representative thereof;

means for detecting a third parameter representative of the relative position of the hitch assembly and for generating a position signal representative thereof; and means for processing at least the vehicle speed signal, the draft signal and the position signal and for generating control signals based thereon for commanding movement of the hitch assembly to maintain reference levels of at least draft and position, the processing means being configured to discontinue control based on the draft signal based upon a predetermined relationship between the vehicle speed signal the a reference speed signal.

19. The control system of claim 18, wherein the processing means prevents implement control based on the draft signal when the vehicle speed is substantially zero.

20. The control system of claim 18, wherein the processing means is configured to control position of the implement in independent modes, including a position mode and a draft mode, and wherein control in the draft mode is prevented based upon the predetermined relationship between the vehicle speed signal and the reference speed signal.

* * * * *